US007009754B2

United States Patent
Huibers

(12) United States Patent
(10) Patent No.: US 7,009,754 B2
(45) Date of Patent: Mar. 7, 2006

(54) DOUBLE SUBSTRATE REFLECTIVE SPATIAL LIGHT MODULATOR WITH SELF-LIMITING MICRO-MECHANICAL ELEMENTS

(75) Inventor: Andrew G. Huibers, Palo Alto, CA (US)

(73) Assignee: Reflectivity, INC, Sunnyvale, CA (US)

( * ) Notice: Subject to any disclaimer, the term of this patent is extended or adjusted under 35 U.S.C. 154(b) by 100 days.

(21) Appl. No.: 11/090,800

(22) Filed: Mar. 24, 2005

(65) Prior Publication Data

US 2005/0174626 A1 Aug. 11, 2005

Related U.S. Application Data

(60) Continuation of application No. 10/948,871, filed on Sep. 24, 2004, now Pat. No. 6,947,200, which is a continuation of application No. 10/748,899, filed on Dec. 29, 2003, now Pat. No. 6,798,561, which is a continuation of application No. 10/153,138, filed on May 20, 2002, now Pat. No. 6,690,502, which is a division of application No. 10/043,703, filed on Jan. 9, 2002, now Pat. No. 6,538,800, which is a continuation of application No. 09/624,591, filed on Jul. 24, 2000, now Pat. No. 6,356,378, which is a continuation of application No. 09/437,586, filed on Nov. 9, 1999, now Pat. No. 6,172,797, which is a continuation of application No. 09/160,361, filed on Sep. 24, 1998, now Pat. No. 6,046,840, which is a continuation-in-part of application No. 08/665,380, filed on Jun. 18, 1996, now Pat. No. 5,835,256.

(60) Provisional application No. 60/000,322, filed on Jun. 19, 1995.

(51) Int. Cl.
*G02B 26/00* (2006.01)
*G02B 26/08* (2006.01)

(52) U.S. Cl. ...................... 359/291; 359/290; 359/223; 359/224

(58) Field of Classification Search ................ 359/291, 359/290, 223, 224, 238, 578, 579, 846, 847, 359/849
See application file for complete search history.

(56) References Cited

U.S. PATENT DOCUMENTS

| | | | |
|---|---|---|---|
| 3,517,126 A | 6/1970 | Yamada et al. | 348/772 |
| 3,553,364 A | 1/1971 | Lee | 359/230 |
| 3,600,798 A | 8/1971 | Lee | 29/592.1 |
| 3,678,196 A | 7/1972 | Roth | 348/771 |
| 3,746,785 A | 7/1973 | Goodrich | 348/771 |

(Continued)

OTHER PUBLICATIONS

Jaecklin, "Line-Addressable Torsional Micromirrors for Light Modulator Arrays", Sensor and Actuators A, 41-42, Elsevier Science, pp. 324-329.

(Continued)

*Primary Examiner*—Timothy Thompson
(74) *Attorney, Agent, or Firm*—Gregory R. Muir

(57) ABSTRACT

A spatial light modulator includes an upper optically transmissive substrate held above a lower substrate containing addressing circuitry. One or more electrostatically deflectable elements are suspended by hinges from the upper substrate. In operation, individual mirrors are selectively deflected and serve to spatially modulate light that is incident to, and then reflected back through, the upper substrate. Motion stops may be attached to the reflective deflectable elements so that the mirror does not snap to the bottom substrate. Instead, the motion stop rests against the upper substrate thus limiting the deflection angle of the reflective deflectable elements.

46 Claims, 18 Drawing Sheets

U.S. PATENT DOCUMENTS

| | | | | |
|---|---|---|---|---|
| 3,746,911 | A | 7/1973 | Nathanson et al. | 348/771 |
| 3,886,310 | A | 5/1975 | Guldberg et al. | 348/771 |
| 4,229,732 | A | 10/1980 | Hartstein et al. | 340/815.4 |
| 4,280,107 | A | 7/1981 | Scifres et al. | 372/99 |
| 4,356,730 | A | 11/1982 | Cade | 73/514.26 |
| 4,383,255 | A | 5/1983 | Grandjean et al. | 345/109 |
| 4,403,248 | A | 9/1983 | Te Velde | 348/771 |
| 4,420,897 | A | 12/1983 | Castleberry | 40/427 |
| 4,492,435 | A | 1/1985 | Banton et al. | 348/771 |
| 4,566,935 | A | 1/1986 | Hornbeck | 348/771 |
| 4,571,603 | A | 2/1986 | Hornbeck et al. | 340/815.4 |
| 4,592,628 | A | 6/1986 | Altman et al. | 73/514.26 |
| 4,596,992 | A | 6/1986 | Hornbeck | 348/772 |
| 4,662,746 | A | 5/1987 | Hornbeck | 359/230 |
| 4,677,311 | A | 6/1987 | Morita | 359/291 |
| 4,680,579 | A | 7/1987 | Ott | 29/592.1 |
| 4,698,602 | A | 10/1987 | Armitage | 348/771 |
| 4,710,732 | A | 12/1987 | Hornbeck | 348/771 |
| 4,786,149 | A | 11/1988 | Hoenig et al. | 359/290 |
| 4,805,038 | A | 2/1989 | Seligson | 358/246 |
| 4,954,789 | A | 9/1990 | Sampsell | 359/318 |
| 4,956,619 | A | 9/1990 | Hornbeck | 359/317 |
| 4,998,262 | A | 3/1991 | Wiggers | 375/356 |
| 5,061,049 | A | 10/1991 | Horbeck | 359/224 |
| 5,078,479 | A | 1/1992 | Vuilleumier | 359/290 |
| 5,085,497 | A | 2/1992 | Um et al. | 359/291 |
| 5,196,767 | A | 3/1993 | Leard et al. | 359/224 |
| 5,216,537 | A | 6/1993 | Hornbeck | 375/356 |
| 5,285,407 | A | 2/1994 | Gale et al. | 359/224 |
| 5,287,215 | A | 2/1994 | Warde et al. | 359/317 |
| 5,303,190 | A | 4/1994 | Pelley, III | 359/240 |
| 5,311,360 | A | 5/1994 | Bloom et al. | 359/318 |
| 5,416,514 | A | 5/1995 | Janssen et al. | 358/296 |
| 5,442,414 | A | 8/1995 | Janssen et al. | 359/290 |
| 5,444,566 | A | 8/1995 | Gale et al. | 358/291 |
| 5,448,314 | A | 9/1995 | Heimbuch et al. | 358/291 |
| 5,452,024 | A | 9/1995 | Sampsell | 375/356 |
| 5,471,341 | A | 11/1995 | Warde et al. | 359/224 |
| 5,493,439 | A | 2/1996 | Engle | 359/290 |
| 5,508,738 | A | 4/1996 | Janssen et al. | 359/291 |
| 5,517,347 | A | 5/1996 | Sampsell | 359/224 |
| 5,535,047 | A | 7/1996 | Hornbeck | 359/295 |
| 5,552,925 | A | 9/1996 | Worley | 359/230 |
| 5,557,177 | A | 9/1996 | Engle | 315/366 |
| 5,567,334 | A | 10/1996 | Baker et al. | 216/24 |
| 5,579,149 | A | 11/1996 | Moret et al. | 359/223 |
| 5,579,151 | A | 11/1996 | Cho | 359/291 |
| 5,583,688 | A | 12/1996 | Hornbeck | 359/291 |
| 5,631,782 | A | 5/1997 | Smith et al. | 359/291 |
| 5,636,070 | A | 6/1997 | Ji et al. | 359/223 |
| 5,669,687 | A | 9/1997 | Yang | 216/24 |
| 5,677,784 | A | 10/1997 | Harris | 315/366 |
| 5,706,061 | A | 1/1998 | Marshall et al. | 359/230 |
| 5,745,193 | A | 4/1998 | Urbanus et al. | 348/771 |
| 5,768,009 | A | 6/1998 | Little | 359/295 |
| 5,774,196 | A | 6/1998 | Marshall | 348/743 |
| 5,784,190 | A | 7/1998 | Worley | 359/291 |
| 5,808,780 | A | 9/1998 | McDonald | 359/290 |
| 5,835,256 | A | 11/1998 | Huibers | 359/291 |
| 5,926,309 | A | 7/1999 | Little | 359/290 |
| 5,999,306 | A | 12/1999 | Atobe et al. | 359/295 |
| 6,046,840 | A | 4/2000 | Huibers | 359/290 |
| 6,053,617 | A | 4/2000 | Kaeriyama | 359/872 |
| 6,107,115 | A | 8/2000 | Atobe et al. | 438/72 |
| 6,356,378 | B1 | 3/2002 | Huibers | 359/291 |

OTHER PUBLICATIONS

Gerhard-Multhaupt et al., "Light-Valve Projection Displays—An Introduction", Displays, vol. 16, No. 1, 1995, Elsevier Science B.V., pp. 5-7.

Gerhard-Multhaupt , "Light-Valve Technologies for High-Definition Television Projection Displays", Displays, 1991, vol. 12, No. 3/4, pp. 115-128.

Peterson, K.E., "Micromechanical Light Modulator Array Fabricated on Silicon", Applied Physics Letters, American Institute of Physics, vol. 31 No. 8, Oct. 15, 1977, pp. 521-523.

Cadman et al., "New Micromechanical Display Using Metallic Thin Films", IEEE Electron Device Letters, Jan. 1983, vol. EDL-4 No. 1, pp. 3-4.

Thomas et al., "The Mirror Matrix Tube: A Novel Light Valve for Projection Displays", IEEE Transactions on Electron Devices, vol. Ed-22 No. 9, Sep. 1975, pp. 765-775.

Hornbeck, "Digital Light Processing (TM) for High-Brightness, High Resolution Applications", Texas Instruments, Inc., date unknown, pp. 1-14.

Yoder, "The Digital Display Technology of the Future", Texas Instruments, Inc., date unknown, pp. 1-11.

Peterson, "Silicon Torsional Scanning Mirror", IBM J. Res. Develop., vol. 24 No. 5, Sep. 1980 pp. 631-637.

DOUBLE SUBSTRATE REFLECTIVE SPATIAL LIGHT MODULATOR WITH SELF-LIMITING MICRO-MECHANICAL ELEMENTS

CROSS-REFERENCE TO RELATED CASES

This application is a continuation of U.S. patent application Ser. No. 10/948,871 filed Sep. 24, 2004, now U.S. Pat. No. 6,947,200, which is a continuation of U.S. patent application Ser. No. 10/748,899 to Huibers filed Dec. 29, 2003, now U.S. Pat. No. 6,798,561 which is a continuation of Ser. No. 10/153,138 to Huibers filed May 20, 2002, now U.S. Pat. No. 6,690,502 which is a divisional application of U.S. patent application Ser. No. 10/043,703 to Huibers filed on Jan. 9, 2002, (now U.S. Pat. No. 6,538,800) which is a continuation of U.S. patent application Ser. No. 09/624,591 to Huibers filed Jul. 24, 2000 (now U.S. Pat. No. 6,356,378), which is a continuation of U.S. patent application Ser. No. 09/437,586 to Huibers filed Nov. 9, 1999 (now U.S. Pat. No. 6,172,797), which is a continuation of U.S. patent application Ser. No. 09/160,361 to Huibers filed Sep. 24, 1998 (now U.S. Pat. No. 6,046,840), which is a continuation-in-part of U.S. patent application Ser. No. 08/665,380 filed on Jun. 18, 1996 (now U.S. Pat. No. 5,835,256), which claims priority from a U.S. provisional patent application Ser. No. 60/000,322 filed on Jun. 19, 1995, the subject matter of each being incorporated herein by reference.

TECHNICAL FIELD OF THE INVENTION

The present invention relates to spatial light modulators, and, more particularly, to spatial light modulators with electronically addressable deflectable elements attached to an optically transmissive substrate.

BACKGROUND OF THE INVENTION

Spatial light modulators (SLMs) are transducers that modulate an incident beam of light in a spatial pattern that corresponds to an optical or electrical input. The incident light beam may be modulated in phase, intensity, polarization, or direction. This modulation may be accomplished through the use of a variety of materials exhibiting magneto-optic, electro-optic, or elastic properties. SLMs have many applications, including display systems, optical information processing, optical data storage, and printing.

A common technology for an SLM cell is to use a liquid crystal material sandwiched between two electrodes, at least one of the electrodes being transparent. By applying a voltage between the electrodes, the orientation of the molecules in the liquid crystal layer changes, which alters the optical properties of the layer, in particular the polarization of light traveling through the layer. Thus, the liquid crystal layer in combination with one or more polarizing filters can be used to create an amplitude modulator (light valve). However, such liquid crystal based devices have several disadvantages for SLM applications. First, much of the light is absorbed in the polarizing filters, reducing optical efficiency. In addition, the devices have limited contrast ratio, (the ratio of the intensities of the pixel when on and the pixel when off), and the response time of the most widely used liquid crystals is very slow (several milliseconds). Liquid crystals also have poor performance outside a fairly narrow temperature range. For these reasons and others, mechanical SLMs, which use moving structures to deflect light, have been pursued.

An early mechanical SLM designed for use in a projection display system is described by Nathanson, U.S. Pat. No. 3,746,911. The individual pixels of the SLM are addressed via a scanning electron beam as in a conventional direct-view cathode ray tube (CRT). Instead of exciting a phosphor, the electron beam charges deflectable reflective elements arrayed on a quartz faceplate. Elements that are charged bend towards the faceplate due to electrostatic forces. Bent and unbent elements reflect parallel incident light beams in different directions. Light reflected from unbent elements is blocked with a set of Schlieren stops, while light from bent elements is allowed to pass through projection optics and form an image on a screen.

Another electron-beam-addressed SLM is the Eidophor, described in E. Baumann, "The Fischer large-screen projection system (Eidophor)" 20 J.SMPTE 351 (1953). In this system, the active optical element is an oil film, which is periodically dimpled by the electron beam so as to diffract incident light. A disadvantage of the Eidophor system is that the oil film is polymerized by constant electron bombardment and oil vapors result in a short cathode lifetime. A disadvantage of both of these systems is their use of bulky and expensive vacuum tubes.

A spatial light modulator in which movable elements are addressed via electrical circuitry on a silicon substrate is described in K. Peterson, "Micromechanical Light Modulator Array Fabricated on Silicon" 31 Appl. Phys. Let. 521 (1977). This SLM contains a 16 by 1 array of cantilever mirrors above a silicon substrate. The mirrors are made of silicon dioxide and have a reflective metal coating. The space below the mirrors is created by etching away silicon via a KOH etch. The mirrors are deflected by electrostatic attraction: a voltage bias is applied between the reflective elements and the substrate and generates an electrostatic force. A similar spatial light modulator is the two-dimensional array described by Hartstein and Peterson, U.S. Pat. No. 4,229,732. Although the switching voltage of this SLM is lowered by connecting the deflectable mirror elements at only one corner, the device has low efficiency due to the small optically active area (as a fraction of the entire device area). In addition, diffraction from the addressing circuitry lowers the contrast ratio of the display.

A silicon-based micro-mechanical SLM in which a large fraction of the device is optically active is the Digital Mirror Device (DMD), developed by Texas Instruments and described by Hornbeck, U.S. Pat. No. 5,216,537 and its references. The most recent implementations include a first aluminum plate suspended via torsion hinges above addressing electrodes. A second aluminum plate is built on top of the first and acts as a mirror. The double plate aluminum structure is required to provide an approximately flat mirror surface that covers the underlying circuitry and hinge mechanism, which is essential in order to achieve an acceptable contrast ratio. The entire structure is made from aluminum alloys—the plates, torsion hinges and special "landing tips" each have independently optimized compositions. Aluminum can be deposited at low temperatures, avoiding damage to the underlying CMOS addressing circuitry during manufacture. Aluminum has the disadvantage, however, of being susceptible to fatigue and plastic deformation, which can lead to long-term reliability problems and cell "memory", where the rest position begins to tilt towards its most frequently occupied position. Additional disadvantages of the DMD include: 1) A large dimple (caused by the mirror support post) is present at the center of the mirror in current designs which causes scattering of the incident light and reduces optical efficiency. 2) The entire DMD structure is released via plasma etching of a polymer sacrificial layer. This manufacturing process is problematic, in that it (a) requires large gaps between mirrors in order for the plasma etch release to be effective, and (b) pixel failures are created during the release process, which is not sufficiently gentle on the delicate micromirror structures. Due to the complex structure and process difficulties, commercialization of the DMD has proceeded slowly.

Another SLM fabricated on a flat substrate is the Grating Light Valve (GLV) described by Bloom, et. al., U.S. Pat. No. 5,311,360. As described in the '360 patent, the GLV's deflectable mechanical elements are reflective flat beams or ribbons. Light reflects from both the ribbons and the substrate. If the distance between the surface of the reflective ribbons and the reflective substrate is one-half of a wavelength, light reflected from the two surfaces adds constructively and the device acts like a mirror. If this distance is one-quarter of a wavelength, light directly reflected from the two surfaces will interfere destructively and the device will act as a diffraction grating, sending light into diffracted orders. A favored approach is to make the device from ceramic films of high mechanical quality, such as LPCVD (low pressure chemical vapor deposition) silicon nitride.

Even though addressing circuitry cannot be placed below such films, an inherent electromechanical bistability can be used to implement a "passive" addressing scheme (Raj Apte, *Grating Light Valves for High Resolution Displays,* Stanford University Ph.D. thesis, June 1994). The bistability exists because the mechanical force required for deflection is roughly linear, whereas the electrostatic force obeys an inverse square law. As a voltage bias is applied, the ribbons deflect. When the ribbons are deflected past a certain point, the restoring mechanical force can no longer balance the electrostatic force and the ribbons snap to the substrate. The voltage must be lowered substantially below the snapping voltage in order for the ribbons to return to their undeflected position. This latching action allows driver circuitry to be placed off-chip or only at the periphery, and addressing circuitry does not need to occupy the optically active part of the array. In practice, this approach is difficult to implement: when the ribbon comes into contact with the substrate, which is at a different potential, charge can be injected into the insulating ceramic ribbon material, shifting the switching voltages and making passive addressing impossible. Film non-uniformity across the device can also shift the switching voltages significantly. Another problem with the GLV technology is sticking: since the underside of the deflected ribbons contacts the substrate with a large surface area, the ribbons tend to stick to the substrate. Films comprising the structure can be roughened, but this results in undesirable optical scattering, reducing the contrast ratio of the device.

Micro-mechanical mirror-based SLMs have an advantage over diffraction-based SLMs because they reflect incident light at only one angle, which can be quite large. This simplifies the design of the optical system in which the modulated light may pass through the center of the imaging lens, while maintaining high efficiency. This results in an image with fewer aberrations and lowers manufacturing cost.

The need therefore is for a spatial light modulator with a high contrast ratio, high efficiency, high speed, which is easy to fabricate, and whose moving elements are made of reliable mechanical materials.

SUMMARY OF THE INVENTION

Briefly, in accordance with an embodiment of this invention, a spatial light modulator comprises an optically transmissive substrate and a circuit substrate. One or more reflective deflectable elements are attached to the lower surface of the optically transmissive substrate. This optically transmissive substrate is held above, and spaced apart from, a circuit substrate containing addressing circuitry capable of selective activation of each reflective deflectable element.

In operation, individual reflective elements are selectively deflected and serve to spatially modulate light that is incident to, and then reflected back through, the optically transmissive substrate.

In one embodiment of this invention, the spatial light modulator comprises an array of pixels. Each pixel comprises a single deflectable rigid mirror and a torsion hinge, which attaches the mirror to an upper, optically transmissive substrate. The optically transmissive substrate is held above a silicon substrate, on which is formed an array of electrodes. In one embodiment, an aperture layer is built into the optically transmissive substrate to block light from reaching the electrodes or the mirror support structure (hinges and attachments). Individual mirrors are selectively deflected electrostatically by applying a voltage bias between individual mirrors and their corresponding electrodes.

In accordance with an embodiment of this invention, a process for fabricating the spatial light modulator is provided. A sacrificial layer is deposited on a substrate. A hole is etched through the sacrificial layer, the hole allowing for attachment of subsequent layers to the optically transmissive substrate. A reflective layer is deposited on the sacrificial layer, and is patterned to define one or more reflective deflectable elements. The reflective layer is connected to the sacrificial layer through the hole. The sacrificial layer is removed so that the reflective elements are free and may deflect. Addressing circuitry and electrodes are formed on a circuit substrate. The substrate and circuit substrate are aligned and joined such that the reflective elements may be selectively actuated by the addressing circuitry and electrodes. The two substrates may be joined, for example, by epoxy around the periphery of the substrates.

In accordance with an embodiment of this invention, a process includes asserting a bias voltage between the reflective deflectable element and the addressing circuitry. The bias voltage may be changed during device operation.

The electrical addressing circuitry on the silicon substrate may be fabricated using standard CMOS technology, and resembles a low-density memory array.

In accordance with another embodiment of the invention, a spatial light modulator is disclosed. The spatial light modulator comprises: a substrate that is transmissive to visible light; a silicon substrate; wherein the silicon substrate and the substrate that is transmissive to visible light are bonded together with a spacer therebetween forming a gap between the substrates; and a plurality of deflectable elements encapsulated within the gap.

In yet another embodiment of the invention, a spatial light modulator is disclosed. The spatial light modulator comprises: a first substrate having a plurality of micromirrors and a spacer that is positioned within the plurality of micromirrors; and a second substrate having an array of electrodes and circuitry, wherein the first and second substrates are bonded together with the spacer between the first and second substrates.

In yet another embodiment of the invention, a spatial light modulator is disclosed, which comprises: first substrate; a second substrate, wherein the first and the second substrates are bonded together with a spacer therebetween so as to form a gap between the substrates; and a plurality of micromirrors positioned within the gap, each micromirror further comprising: a mirror plate, further comprising: a first and second portions, wherein the second portion moves away from the first substrate when the first portion moves towards the first substrate; a hinge that is located in a plane other than a plane in which the mirror plate is located; and wherein the mirror plate is attached to the hinge such that the mirror plate is operable to rotate.

In yet another embodiment of the invention, a method of modulating light is provided, which comprises: providing a spatial light modulator that comprises a first and second substrates, the first substrate being optically transmissive and being held above the second substrate, an electrostatically deflectable mirror suspended by a hinge from the optically transmissive substrate, the second substrate containing an electrode and circuitry; providing an incoming light beam that passes through the optically transmissive substrate and that is reflected by the electrostatically deflectable mirror; applying a voltage bias between the mirror and the electrode so as to deflect the mirror due to electrostatic attraction; and deflecting the light beam back through the optically transmissive substrate.

In yet another embodiment of the invention, a method of making a spatial light modulator is provided, which comprises: forming a plurality of micromirrors on a first substrate; forming a plurality of circuitry and electrodes on a second substrate; and joining the first and second substrates together with a spacer therebetween by bonding with an adhesive.

In yet another embodiment of the invention, a method of modulating light is disclosed. The method comprises: providing a spatial light modulator that comprises: a substrate that is transmissive to visible light; a silicon substrate having a plurality of electrodes and circuitry; wherein the silicon substrate and the substrate that is transmissive to visible light are bonded together with a spacer therebetween forming a gap between the substrates; and a plurality of deflectable elements encapsulated within the gap; providing an incoming light beam that passes through the light transmissive substrate and that is reflected by the electrostatically deflectable elements; applying a voltage bias between the deformable element and the electrode so as to deflect the deflectable element due to electrostatic attraction; and deflecting the light beam back through the optically transmissive substrate.

Since the two substrates are joined together only after they are individually fabricated, the fabrication processes for each substrate are decoupled. As there is no concern for CMOS compatibility during the manufacturing of the top substrate, an advantage of the spatial light modulator of this invention is that the mechanically deflectable reflective elements can be made from materials chosen only for their excellent mechanical properties, such as LPCVD-deposited silicon nitride, silicon oxide, amorphous silicon and polysilicon. Since these films are deposited at high temperatures, they are not normally compatible with CMOS processes, because the latter use aluminum interconnects which would melt at these higher temperatures.

A further advantage of this spatial light modulator is that after the two substrates are bonded together, the moving parts may be fully encapsulated. This provides an excellent method of packaging and leads to high device robustness.

The spatial light modulator of this invention has the further advantage that it is inexpensive and straightforward to construct. It is composed of two substrates: one which may be made using standard CMOS techniques, and a second optically transmissive substrate containing the deflectable reflective elements, which is very simple to fabricate.

Yet another advantage of this spatial light modulator is that a light blocking aperture layer, as well as other planar optics (e.g. color filters, reflectivity enhancement coatings, micro-lenses) can be incorporated into the optically transmissive substrate. This can improve the contrast ratio and increase the effective light deflection angle, and reduce the cost of free-space optics at the systems level.

Yet another advantage of this spatial light modulator is that the motion limiting structures can also be made of high-temperature materials which are hard and have long lifetimes. Because of their hardness and geometry, the motion limiting structures have a small contact area during operation, which greatly reduces sticking forces between the structures and the substrate. Also, the motion limiting structures are at the same electrical potential as the substrate with which they come into contact which prevents sticking via welding and charge injection. These were problems encountered with early versions of the DMD and the GLV.

Yet another advantage of this spatial light modulator is that the high-temperature processing of the optically transmissive substrate allows for the deposition of dielectric films with alternating high-low indices of refraction onto the deflectable reflective elements, which enhance their reflectivity.

These and other advantages will become apparent to those skilled in the art after consideration of the ensuing drawings and detailed description.

REFERENCE NUMERALS IN THE DRAWINGS

Figure 1:
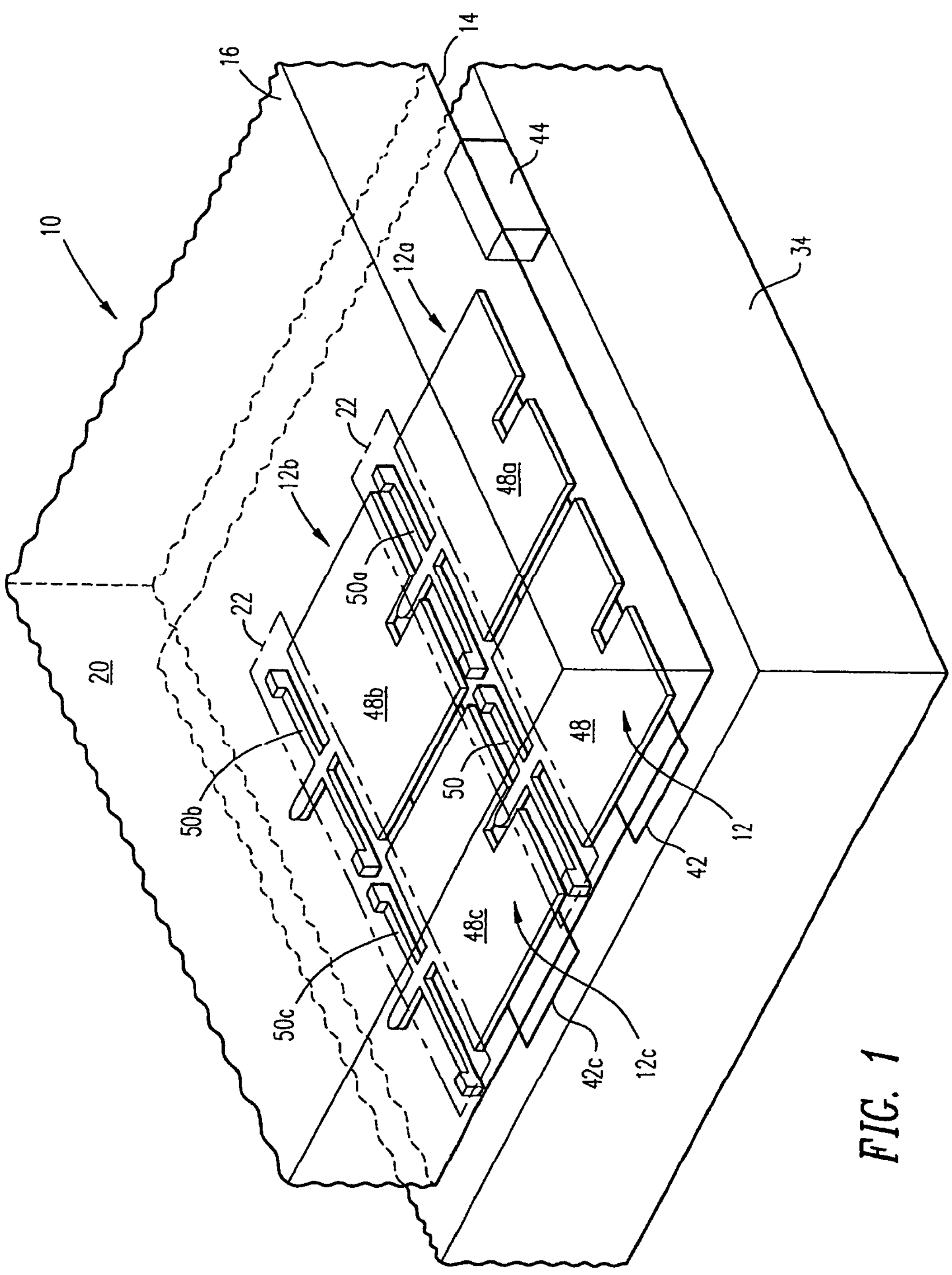
FIG. 1 shows a top perspective view of a corner of an embodiment of a spatial light modulator of the present invention.

10 Micro-mechanical spatial light modulator (SLM)
12 Pixel cells
14 Lower surface
16 Upper surface
20 Optically transmissive substrate
22 Aperture layer
24 Protective layer
25 Hole
26 Sacrificial layer
28 Mirror structural support layer
30 Hinge layer
32 Reflective layer
34 Circuit substrate
36 Addressing circuitry
38 Passivation layer
42 Bottom electrode
43 Contact
44 Spacer
46 Passivation layer
48 Mirror
49 Motion stop
50 Hinge
51 Hinge support
54 Attachment region
56 Incoming light beam
58 Outgoing light beam
60 Word line
62 Bit line
64 Light source
66 Imaging optics
68 Transistor
70 First dielectric layer
72 Second dielectric layer
74 Voltage source
78 Optical dump
111 Bumps

DETAILED DESCRIPTION OF THE INVENTION

This description refers to several figures which contain reference numerals. The same reference numerals in different figures indicate similar or identical items.

Throughout this description, the words "optical" and "light" are used. In the description and claims, "optical" means related to any electromagnetic frequencies, not just frequencies in the visible range. For example, an "optically transmissive substrate" is a substrate which is transmissive to electromagnetic propagation of a working frequency, whether in the visible range or not.

Figure 13:
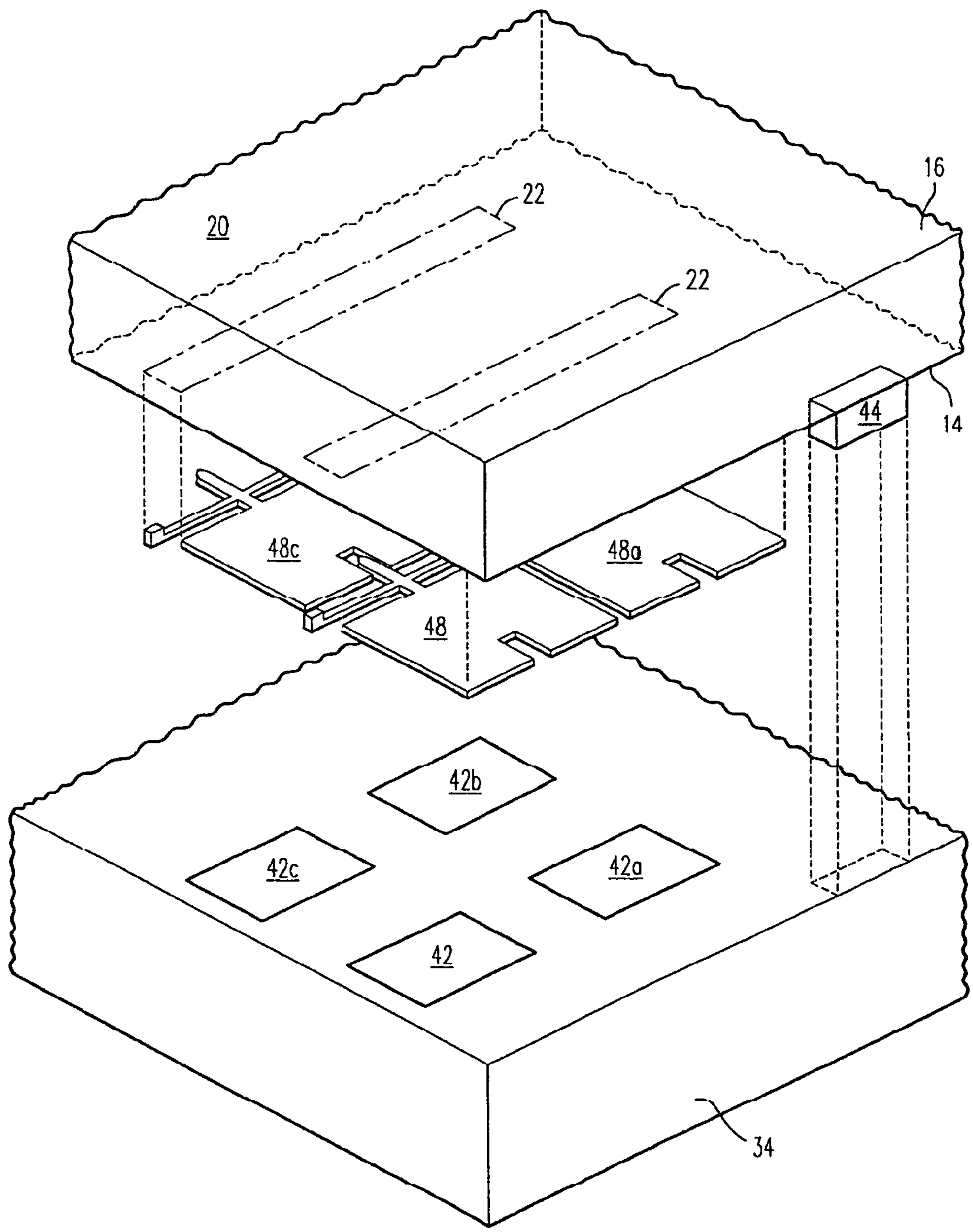
FIG. 13 shows an exploded top perspective view of a corner of an embodiment of a spatial light modulator of the present invention.

A top perspective view of a corner of an embodiment of a micro-mechanical spatial light modulator 10 (hereinafter, "SLM 10") of this invention is shown in FIG. 1. An exploded view of the SLM 10 of FIG. 1 is shown in FIG. 13. SLM 10 may include pixel cells of any configuration or array size. However, for clarity, only four pixel cells 12, 12*a,* 12*b* and 12*c* in a two by two grid configuration are shown in FIG. 1. The pixel cells 12, 12*a,* 12*b* and 12*c* have a pixel pitch of, for example, 12 microns. "Pixel pitch" is defined as the distance between like portions of neighboring pixel cells.

Reflective deflectable elements (e.g., mirrors 48, 48*a,* 48*b* and 48*c*), each corresponding to a respective pixel cell 12, 12*a,* 12*b* and 12*c,* are attached to the lower surface 14 of an optically transmissive substrate 20 in an undeflected position. Thus, mirrors 48, 48*a,* 48*b* and 48*c* are visible through optically transmissive substrate 20 in FIG. 1. For clarity, light blocking aperture layers 22, between the mirrors 48, 48*a,* 48*b* or 48*c* and the optically transmissive substrate 20, are represented only by dashed lines so as to show underlying hinges 50, 50*a,* 50*b* and 50*c*. The distance separating neighboring mirrors may be, for example, 0.5 microns or less.

One process for fabricating SLM 10 is illustrated in bottom perspective view in FIGS. 2A–2F. For clarity, only the fabrication of pixel cell 12 is described. However, from this description, it will be apparent that pixel cells 12*a,* 12*b,* 12*c* and the other pixel cells in SLM 10 may be fabricated at the same time and in the same manner as pixel cell 12 is fabricated.

The optically transmissive substrate 20 is made of materials which can withstand subsequent processing temperatures. The optically transmissive substrate 20 may be, for example, a 4 inch quartz wafer 500 microns thick. Such quartz wafers are widely available from, for example, Hoya Corporation U.S.A at 960 Rincon Circle, San Jose, Calif. 95131.

Figure 2A:
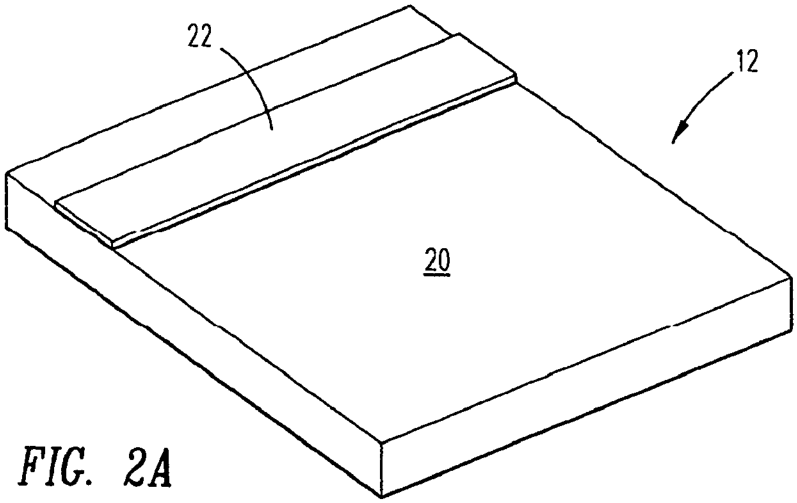
FIGS. 2A–2F show a bottom perspective view of a pixel cell of FIG. 1 during several stages of fabrication.

As seen in FIG. 2A, a light blocking layer (e.g., a 50 nm thick tungsten layer) is deposited and patterned to form the light-blocking aperture layer 22. The aperture layer 22 is made out of an opaque material (e.g., tungsten) which remains stable during subsequent fabrication steps. The tungsten may be deposited using, for example, well-known sputtering techniques. A pattern of photoresist is formed over the aperture layer 22 using well-known photolithographic processes. Aperture layer 22 is then etched using a Drytek 100 plasma etcher. A mixture of 50% by volume $SF_6$ and 50% by volume $C_2ClF_5$ is introduced into the reaction chamber of the etcher at a rate of 300 sccm (150 sccm for $HF_6$ and 150 sccm for $C_2ClF_5$). Etching occurs at a pressure of approximately 100 mTorr with the power setting on the etcher at 500 watts until the optically transmissive substrate 20 is exposed (approximately one minute). After etching, the remaining photoresist is removed using a conventional oxygen plasma strip. Patterning described hereinafter may be similarly performed.

Figure 2B:
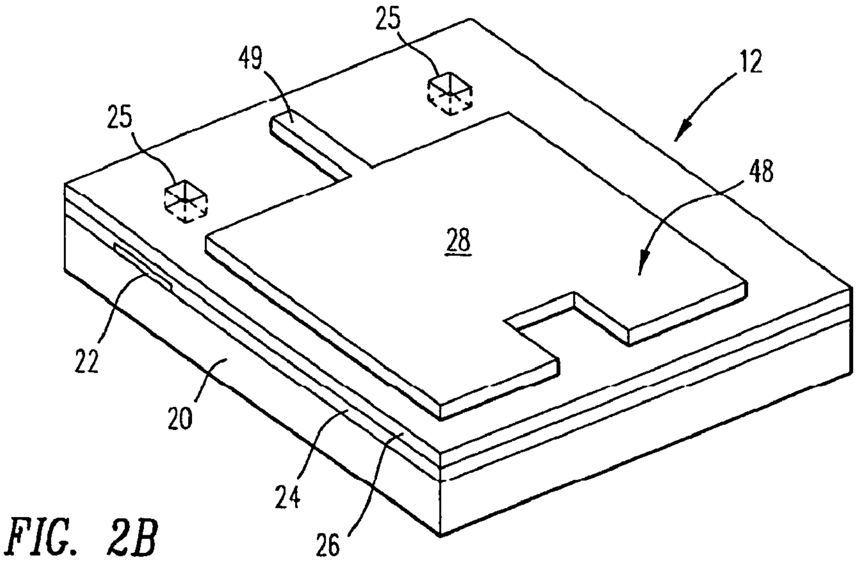

As seen in FIG. 2B, an optically transmissive protective layer 24 (e.g., an approximately 94 nm thick 7%-by-weight phosphorus-doped silicon dioxide) is next deposited as a passivation layer. The reflective deflectable element (mirror 48) is to be connected to optically transmissive substrate 20 through protective layer 24. The silicon dioxide protective layer 24 may be deposited, for example, by LPCVD processes in the quartz tube of a Tylan furnace at approximately 400° C. and 250 mTorr for approximately 5 minutes. $SiH_4$, $O_2$, and $PH_3$ are introduced into the chamber at rates of 28, 115, and 7 sccm, respectively. The phosphorous-doped silicon dioxide is then reflowed at 1100° C. for 20 minutes in a steam environment.

A sacrificial layer 26 (e.g., an approximately 0.6 μm thick amorphous silicon layer), which will eventually be removed as described hereinafter, is deposited on the protective layer 24. The amorphous silicon layer may be deposited using LPCVD processes in, for example, the quartz tube of a Tylan furnace. The SLM 10 is exposed in the quartz tube at approximately 670° C. and 200 mTorr for 135 minutes. A composition of $SiH_4$ and $H_2$ is introduced into the quartz tube at a flow rate of 246 sccm (146 sccm for $SiH_4$ and 100 sccm for $H_2$).

Holes 25 are patterned through sacrificial amorphous silicon layer 26 by selective anisotropic etching by using, for example, patterned plasma etching in a 50% $SF_6$ and 50% $C_2ClF_5$ (by volume) environment until a portion of protective layer 24 is exposed through sacrificial layer 26. Such etching may occur in the reaction chamber of a Drytek 100 plasma etcher. The gas composition is introduced at a rate of 100 sccm (50 sccm for $SF_6$ and 50 sccm for $C_2ClF_2$), and a pressure of 150 mTorr. Typically, it takes approximately 4.5 minutes to expose the portion of protective layer 24 through sacrificial layer 26 under these conditions.

A mirror structural support layer 28, for example an approximately 138 nm thick low-stress silicon nitride layer, is deposited and patterned to form mirror 48 and motion stop 49. Mirror 48 is a substantially rigid plate. The low stress silicon nitride layer may be deposited, for example, in a quartz tube of a Tylan furnace by using LPCVD processes at approximately 785° C. and 250 mTorr for approximately 36 minutes. Deposition occurs, for example, by introducing $SiCl_2H_2$ and $NH_3$ into the quartz tube at 165 sccm and 32 sccm, respectively. After deposition and patterned light exposure of photoresist, the silicon nitride may be etched using an AMT 8100 hexagonal-electrode plasma etcher powered at 1200 watts. The etch gases, for example, $O_2$ and $CHF_3$, are introduced into the reaction chamber at respective flow rates of 6 sccm and 85 sccm, respectively, with an etch period of 17 minutes. Under these conditions, the polysilicon to silicon nitride selectivity ratio is approximately 1:6.

Figure 2C:
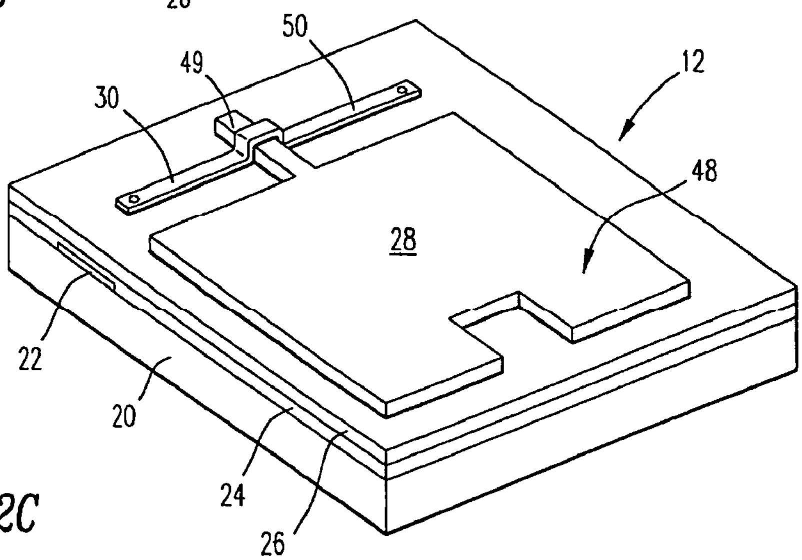
Figure 2D:
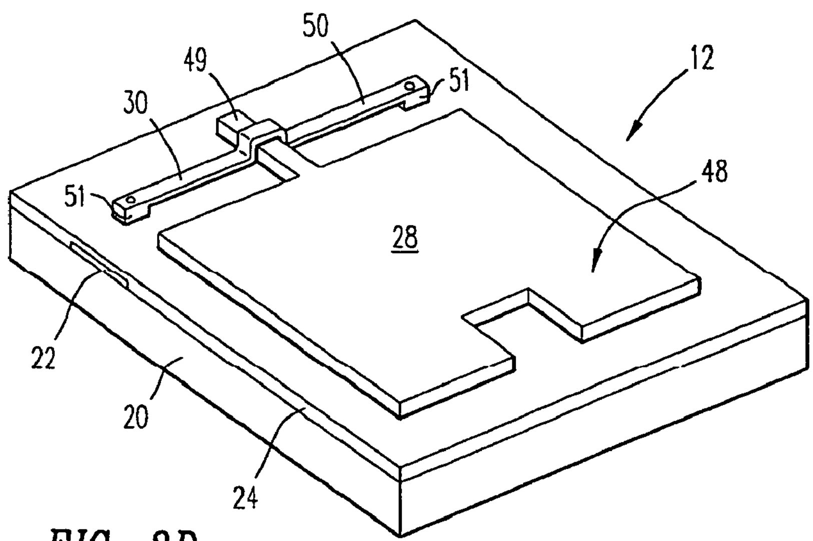
Figure 2E:
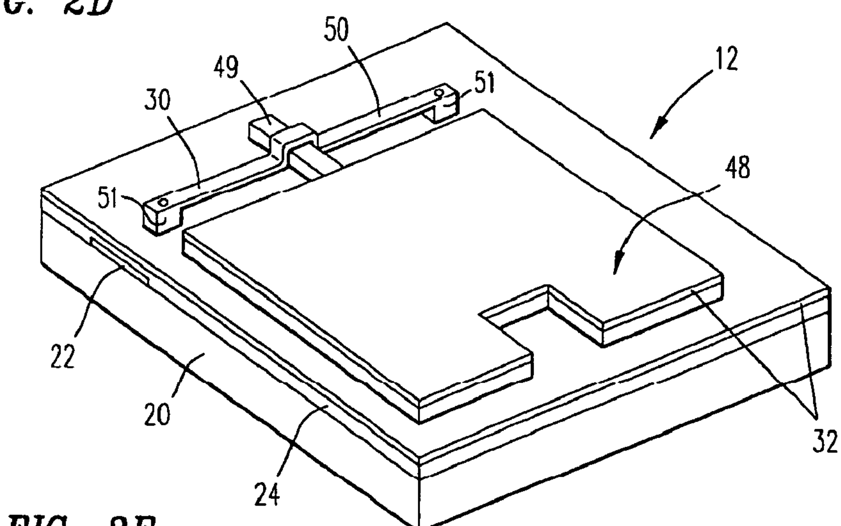
Figure 2F:
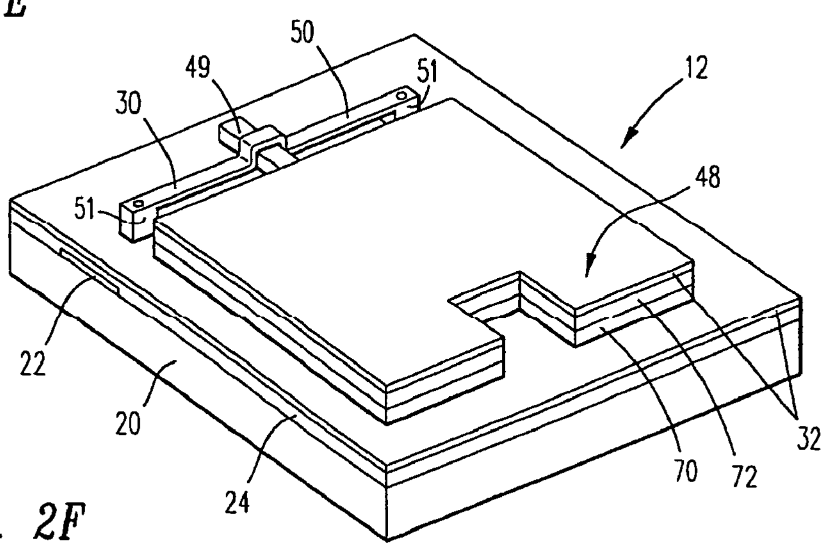
Figure 8A:
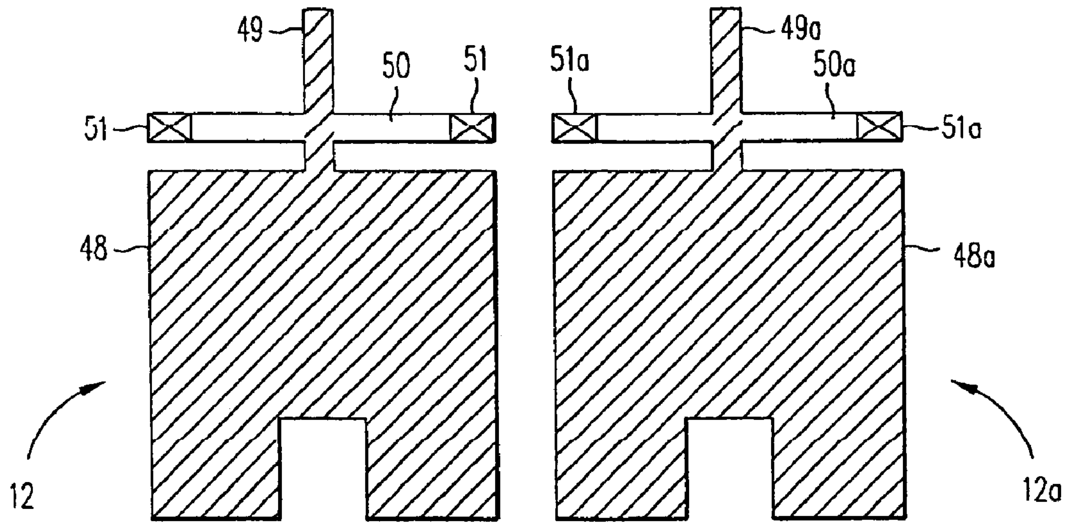
FIGS. 8A–8H show bottom views of mirror arrays with different hinge designs.

As seen in FIG. 2C, a hinge layer 30 (e.g., an approximately 40 nm thick layer of low-stress silicon nitride) is then grown and patterned to additionally define the torsion hinge 50 (a top view of this pattern can be seen in FIG. 8A). At least a portion of hinge 50 contacts protective layer 24 through holes 25 to define supports 51 (FIGS. 2D–2F). The hinge 50 operates by "torsion" which means that the hinge 50 is twisted by applying torque about the longitudinal direction of the hinge 50. Thus, the end of hinge 50 attached to the mirror 48 is angularly deflected with respect to the ends supported by supports 51 and 51. Hinge 50 may be, for example, approximately 0.5 microns wide.

The thin layer of low stress silicon nitride for the hinge layer 30 is deposited in a quartz tube of a Tylan furnace using an LPCVD process. $SiCl_2H_2$ and $NH_3$ are introduced into the quartz tube at a flow rate of, for example, 165 sccm and 32 sccm, respectively. The deposition occurs, for example, at a temperature of 785° C. and at a pressure of 250 mTorr for 11 minutes.

As shown in FIG. 2D, the sacrificial layer 26 is then partially removed using an isotropic etch process. The etch process is isotropic so that portions of the sacrificial layer 26 are removed from underneath the mirror 48 and hinge 50. After the partial etch of sacrificial layer 26, the sacrificial layer 26 that is not underneath mirror 48 and hinge 50 is removed. On the other hand, significant portions of the sacrificial layer 26 underneath mirror 48 and hinge 50 remain due to the protection of mirror 48 and hinge 50. Therefore, after the partial etch, sacrificial layer 26 continues to support mirror 48 and hinge 50 and prevents airborne particulates from lodging underneath mirror 48 and hinge 50 during further fabrication steps described hereinafter. One suitable isotropic etch process is by exposure to a plasma etching process in the reaction chamber of a Drytek 100 plasma etcher. Approximately 100% $SF_6$ is introduced into the reaction chamber at a flow rate of approximately 50 sccm with the power setting on the etcher set at 375 watts. Etching occurs for approximately 100 seconds at room temperature (however, the plasma generates heat), and a pressure of approximately 150 mTorr. In this process, the selectivity ratio of silicon to silicon nitride is approximately 6:1.

Referring to FIG. 2E, horizontal surfaces (e.g., mirror structural support layer 28, hinge layer 30, and portions of protective layer 24) of the SLM 10 are then coated with a conductive and reflective layer 32 (e.g., approximately 30 nm thick layer of aluminum) which is optically reflective. Some vertical surfaces (e.g., the vertical surface of hinge 50 proximate the mirror 48) are also coated to electrically connect the reflective layer 32 on the mirror structural support layer 28 with the reflective layer 32 on the protective layer 24. For clarity, the portions of reflective layer 32 on hinge layer 30 and the vertical surfaces are not shown in FIG. 2E. Such a reflective layer 32 may be deposited by, for example, evaporating aluminum downwardly at an angle such that the horizontal vector of the angle is from mirror 48 to motion stop 49. With this angle, no metal (aluminum) exists on protective layer 24 at the point where motion stop 49 contacts protective layer 24 because motion stop 49 shields this surface from metal deposition. Note that the protective layer 24 is exposed due to the partial etching of sacrificial layer 26 described above. The evaporation may occur, for example, in the reaction chamber of an e-gun thermal evaporator at a deposition rate of one nanometer per second.

Spacers 44 (FIGS. 1 and 13) are provided on the optically transmissive substrate. Spacers 44 are, for example, composed of Hoechst-Delanese AZ4330-RS photoresist, spun on at 5000 rpm for 30 seconds, exposed and patterned to form spacers 44 using conventional photolithographic techniques, then hard baked at 233° C. for 1 hour to give increased structural rigidity.

The mirrors 48*a*, 48*b* and 48*c* are fully released from optically transmissive substrate 20, except at hinge supports 51 and 51, with a second isotropic etch, for example, a xenon diflouride etch process, which completely removes the sacrificial layer 26. This etching is performed at approximately 4 Torr in an approximately 100% xenon diflouride environment for approximately 20 minutes at room temperature. Under these conditions the selectivity of this etching process is over a hundred to one.

Figure 3A:
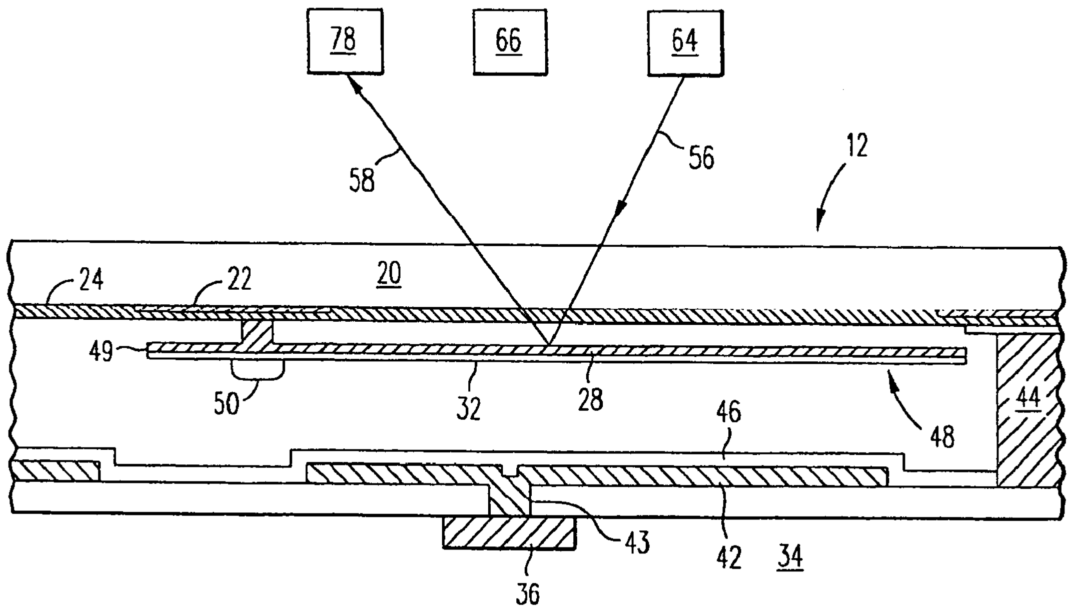
FIGS. 3A and 3B show a cross-section of a pixel cell of FIG. 1 modulating a light beam.

The optically transmissive substrate 20 with the mirror array attached thereto is now ready to bond to a circuit substrate 34 (e.g., a semiconductor substrate) containing addressing circuitry 36, as shown in cross section in FIG. 3A. Spacers 44 (FIGS. 1 and 13) are bonded to the circuit substrate 34 to hold optically transmissive substrate 20 apart from, but in close proximity to, circuit substrate 34.

In one embodiment, planar optical elements such as two dielectric layers 70 and 72 (FIG. 2F) having a different index of refraction are deposited as mirror structural support layer 28. This stack of dielectric layers may reflect light or filter out specific frequency ranges. For example, a layer of silicon dioxide (optical index of 1.46) deposited on top of a layer of silicon nitride (with an optical index of 2.0) will enhance the reflectivity of, for example, aluminum reflective layer 32 with a reflectivity of 92% to 95% over much of the optical spectrum if the silicon nitride layer is 68 nm thick and the silicon dioxide layer is 96 nm thick.

After sacrificial layer 26 is fully etched away, optically transmissive substrate 20 is bonded to the circuit substrate 34. First, the substrates 20 and 34 are optically aligned and held together, and can be glued together with epoxy dispensed around the edge of circuit substrate 34. Since the top substrate 20 is optically transmissive, alignment can be accomplished easily by aligning a pattern on the optically transmissive substrate 20 to a pattern on the circuitry substrate 34. By dispensing epoxy around the edges of optically transmissive substrate 20 and circuit substrate 34 in a clean environment, the mirror 48 may be isolated from airborne particulates.

In FIG. 3A, a bottom electrode 42 (e.g., a 500 nm thick aluminum bottom electrode) of cell 12 is shown connecting to addressing circuitry 36 through contact 43. Many configurations are possible. In one embodiment, the active bottom electrode 42 should be physically located higher than the rest of the circuit components 36 and interconnects. In this embodiment, the bottom electrode 42 interacts with the overhanging mirror 48 through electrostatic forces.

Figure 3B:
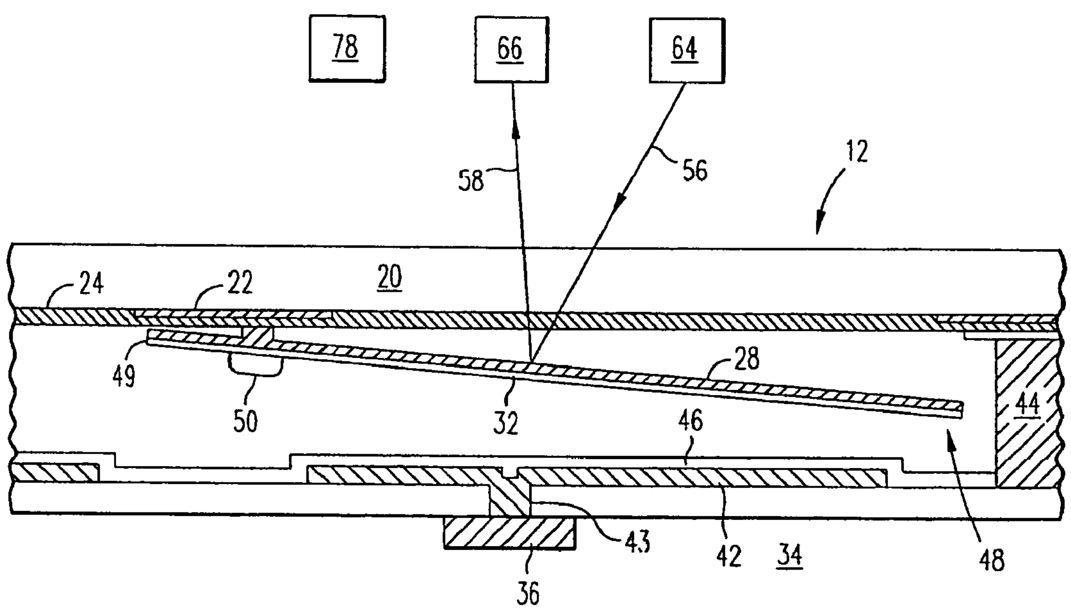

The operation of the above-described embodiment is shown in FIG. 3A and FIG. 3B. In FIG. 3A, the mirror 48 is undeflected. In this unbiased state, an incoming light beam, from a light source 64, obliquely incident to SLM 10 passes through the optically transmissive substrate 20 and is reflected by the flat mirrors 48 and partially reflected by aperture layer 22. The angle of the outgoing light beam 58 is thus also oblique to the optically transmissive substrate 20. The outgoing light beam may be received by, for example, an optical dump 78. The incorporation of the aperture layer 22 into the optically transmissive substrate 20 is a technique to eliminate unwanted light scattering from the underlying hinge 50.

Cell 12 with a voltage bias applied between the mirror 48 and the bottom electrode 42 applied is shown in FIG. 3B. The mirror 48 is deflected due to electrostatic attraction. Because of the design of the hinge 50, the free end of the mirror 48 is deflected towards the circuit substrate 34. Note that hinge 50 may be more flexible than mirror 48 such that the application of force causes substantially all of the bending to be in hinge 50. This may be accomplished by making hinge layer 30 much thinner than mirror structural support layer 28 as described above. The deflection of the mirror 48 deflects the outgoing light beam 58, by a significant angle, into the imaging optics 66.

The motion of mirror 48 is limited by motion stop 49 contacting the protective layer 24 deposited on optically transmissive substrate 20 (see FIG. 3B) so that mirror 48 does not contact the circuit substrate 34. Since contact does not occur, the electrically connected mirrors 48, 48*a*, 48*b* and 48*c* remain at the same potential. Also, there is no charge injection and welding between the mirror 48 and the electrode 42 which can result in sticking. When mirror 48, in the undeflected position, is separated from optically transmissive substrate 20 by, for example, 2.8 microns, the motion stop 49 may extend (for example, approximately 3.3 microns) from the pivot axis of hinge 50.

Figure 4:
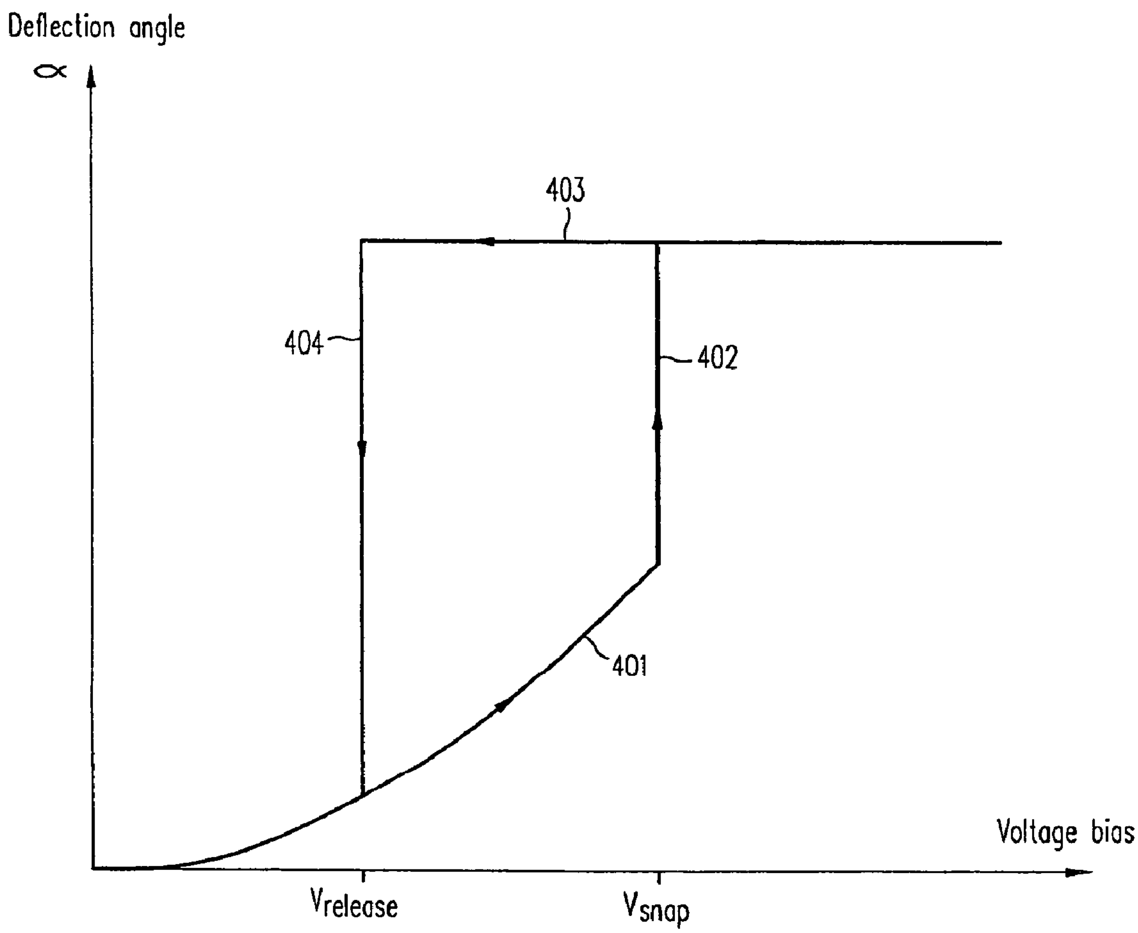
FIG. 4 shows a graph of hysteresis in the deflection angle of the mirror of FIG. 1 versus applied voltage bias.
Figure 5:
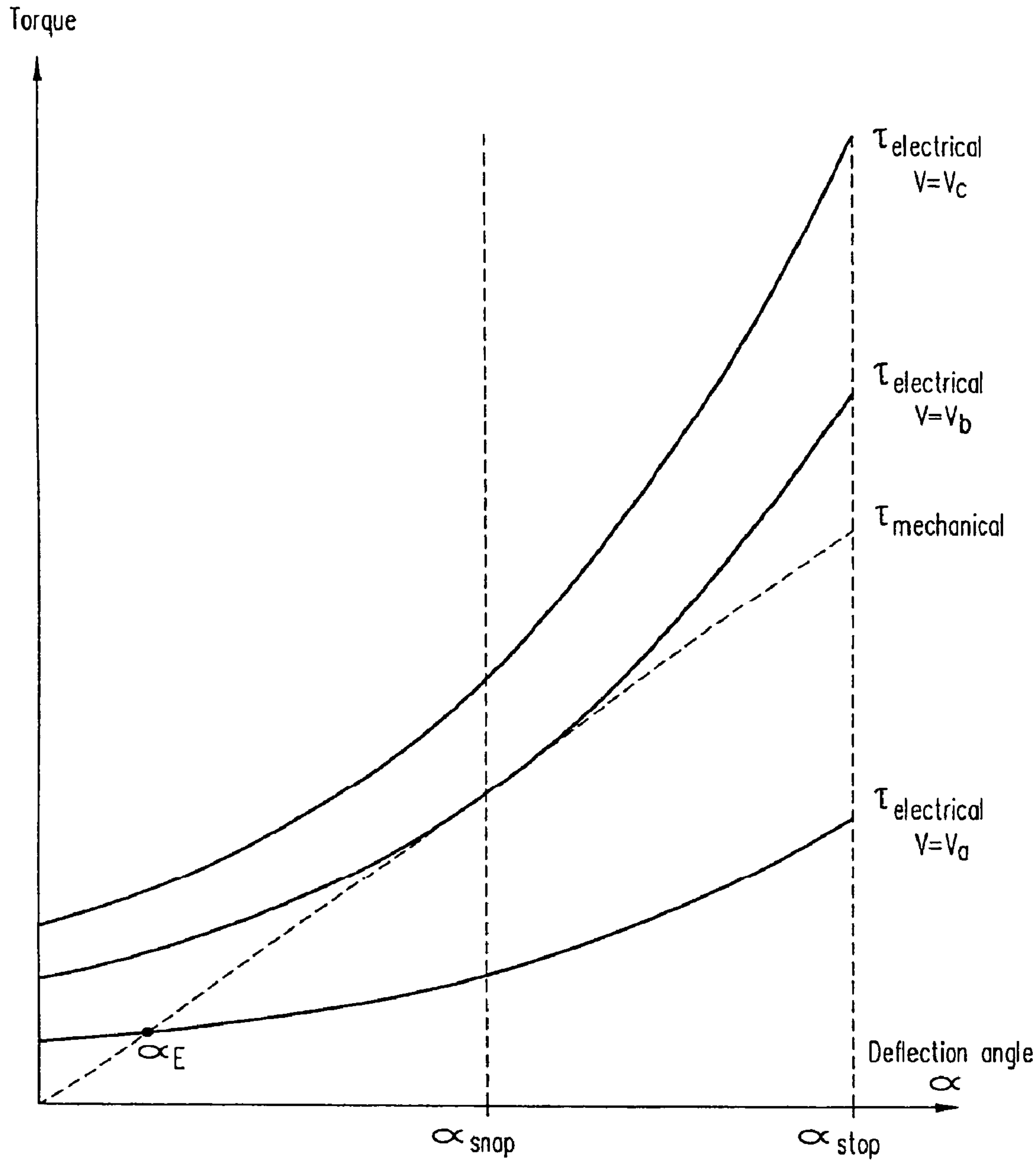
FIG. 5 shows a graph of the electrical and mechanical torques acting on a deflectable mirror for several different bias voltages.

The full electromechanical characteristics of the modulator are further elucidated in FIG. 4 and FIG. 5. In FIG. 4, deflection angle $\alpha$ of the mirror 48 is plotted against the voltage bias and hysteresis is observed. As a voltage bias is applied between mirror 48 and electrode 42 (FIGS. 3A and 3B), the mirror 48 deflects (see line 401 of FIG. 4). When the mirror 48 deflects past the snapping voltage $V_{snap}$ (e.g., approximately 6.8 volts), the restoring mechanical force of the hinges 50 can no longer balance the electrostatic force and the mirror 48 snaps toward the electrode 42 of the circuit substrate 34 (see line 402 of FIG. 4) until motion stop 49 contacts optically transmissive substrate 20. The voltage must be lowered substantially below the snapping voltage (see line 403 of FIG. 4) to $V_{release}$ (e.g., approximately 5.6 volts) in order for the mirror 48 to return towards its undeflected position (see line 404 of FIG. 4). Thus, the mirror 48 would be an electromechanically bistable device between voltages $V_{release}$ and $V_{snap}$. In other words, given a specific voltage between $V_{release}$ and $V_{snap}$ there are two possible deflection angles $\alpha$ of mirror 48 depending on the history of mirror 48 deflection. Therefore, mirror 48 deflection acts as a latch. These bistability and latching properties exist since the mechanical force required for deflection is roughly linear with respect to deflection angle $\alpha$, whereas the opposing electrostatic force is inversely proportional to the distance between mirror 48 and electrode 42.

This latching action allows driver circuitry to be placed off-chip or only at the periphery using passive addressing instead of having a memory cell for driving each electrode. For example, each electrode 42 in each given row may be electrically connected while each mirror 48 in each given column is electrically connected. During addressing, for each pixel cell not in the same row or column as the addressed pixel cell, the applied voltage bias is at an intermediate voltage (e.g., 6.2 volts) between $V_{release}$ and $V_{snap}$. Thus, for these pixel cells, the deflection of mirror 48 represents a one binary state (e.g., a binary one) if the mirror 48 is deflected at line 403 and the other binary state (e.g., a binary zero) if the mirror is deflected at line 401. In other words, this intermediate voltage does not uniquely determine the state of mirror 48 deflection.

If an on state (or an off state) is to be programmed at the addressed pixel cell, the electrode 42 voltage of the addressed pixel cell row is altered to increase (or decrease to turn off) the applied bias voltage. The mirror 48 voltage of the addressed pixel cell column is also altered to increase (or decrease to turn off) the applied bias voltage. For unaddressed pixel cells that happen to be in the same row or column as the addressed pixel cell, the applied bias voltage increases (or decreases to turn off), but is still between $V_{release}$ and $V_{snap}$. Therefore, the binary states do not change for the unaddressed pixel cells that are in the same row and column as the addressed pixel cell. However, for the addressed pixel cell, both the electrode 42 and mirror 48 voltages have been altered to increase (or decrease to turn off) the applied bias voltage. This increase is greater than $V_{snap}$ (or the decrease is less than $V_{release}$ to turn off the addressed pixel) and thus the addressed pixel cell is on (or off). In order to address and program, only one driver circuit for each row and column is needed. Therefore, the driver circuits may be placed along the periphery of the device or off chip.

Even for fully active addressing in which each electrode 42 has a driving circuit (such as a transistor in a DRAM configuration), connecting mirrors in groups could increase addressing efficiency. This may be accomplished either with connections at the periphery of the mirror array, or by depositing pillars connecting the mirrors to the circuit substrate at pixel locations. Since the electrostatic force depends only on the total voltage between conductive and reflective layer 32 and bottom electrode 42, a negative voltage applied to a mirror group (via reflective layer 32) reduces the operating voltage of the corresponding electrodes thus reducing the voltage requirement of SLM 10. It is desirable, for example, to keep the operating voltage below 5V because 5V switching capability is standard to the semiconductor industry. In addition, the amount of charge needed to bias each electrode of the addressed pixel is smaller than an embodiment in which all mirrors are held at ground. Thus the time required to program the addressed pixel cell is relatively fast.

In FIG. 5, we plot mechanical and electrical torques vs. deflection angle $\alpha$ as the applied voltage bias is increased and the mirror 48 tilts. As shown in FIG. 5, the mechanical torque $\tau_{mechanical}$ caused by the mechanical restoring force of the hinge 50 is roughly linear relative to the deflection angle $\alpha$. On the other hand, each electrical torque ($\tau_{electrical}$) curve caused by the electrostatic force between the mirror 48 and electrode 42 obeys an inverse square law and rises sharply with increasing deflection angle $\alpha$ (as the capacitance of the mirror 48-electrode 42 structure is increased). At low voltage biases, as exemplified by bottom curve ($V=V_a$), there is an equilibrium point $\alpha_E$. If the mirror 48 is slightly more (or less) tilted than the equilibrium point $\alpha_E$, the upward directed mechanical force (or the downward directed electrostatic force) dominates and the mirror 48 deflects back up (or down) to the equilibrium point $\alpha_E$. By changing the on-state voltage bias between the mirror 48 and electrode 42, the tilt of the mirror 48 is controlled.

If the voltage bias between mirror 48 and electrode 42 exceeds a critical value (here $V=V_b$ as seen in the middle curve), the equilibrium point $\alpha_E$ no longer exists and the mirror 48 snaps toward the circuit substrate 34 (see line 402 of FIG. 4). Snapping occurs when the mirror 48 is approximately half-way deflected towards the circuit substrate 34 if the mechanical torque is linear in angle. If no alternate stopping mechanisms were in place, the snapping action would continue until mirror 48 makes contact with electrode 42. It may be desirable to avoid this mode of operation because sticking might occur due to welding. Welding is particularly likely when the surfaces making contact are originally at different electrical potentials, or when large contact surface areas are in play as occur with malleable materials such as metal.

The motion stops 49 described above are made of hard materials such as silicon nitride. These hard materials have potentially longer lifetimes than metal structures. Motion stops 49 also have a limited contact area with the optically transmissive substrate 20 and therefore reduce sticking forces. By keeping the motion stops 49 at the same potential as the reflective layer 32 with which they come into contact, electrical potential differences that lead to welding can also be avoided. Snapping and thus physical contact between motion stops 49 and optically transmissive substrate 20 can be avoided entirely by keeping $V<V_b$.

If the SLM 10 is operated at voltages past the snapping point, it can be operated in a digital manner using either active addressing (i.e., a separate transistor drives electrode 42 at each pixel location), or using passive addressing (i.e., only one driver circuit for each row or column), by exploiting the electromechanical bistability mentioned earlier. If SLM 10 operates at voltages greater than $V_{snap}$, deflection along line 403 may represent one binary state while all other deflections represent the other binary state.

If the SLM 10 is operated at voltages below the snapping point, it can be operated in an analog fashion using active addressing. For example, for different deflection angles $\alpha$, a different intensity of light may be reflected to imaging optics 66 if light source 64 emits rays from a wide range of locations. The use of high quality mechanical materials described above results in good uniformity over the pixel array, and makes analog operation practical. The mirror 48 deflection will then be proportional to the charge stored at each corresponding electrode. Operation below the snapping point also has the advantage of preventing mechanical contact during operation, eliminating possible sticking problems.

For mirror operation past the snapping voltage, it is further possible to vary the addressing voltage as a function of time as follows. During the active addressing stage, the addressing is set to the level required for electrostatic-force-based mirror deflection for those electrodes where mirror deflection is required. After the mirrors in question have deflected, the voltage required to hold in the deflected position is less than that required for the actual deflection. This is because the gap between the deflected mirror and the addressing electrode is already smaller than when the mirror is in the process of being deflected. Therefore, in the stage after the active addressing stage, (called the "hold stage", for example), the addressing voltage level could be reduced from its original level without substantially affecting the state of the mirrors. One advantage of having a hold stage voltage is that the undeflected mirrors are now also subject to a smaller electrostatic attractive force than before, and they therefore attain a position closer to the zero-deflected position. This improves the optical contrast ratio between the deflected mirrors and the undeflected mirrors.

Figure 6A:
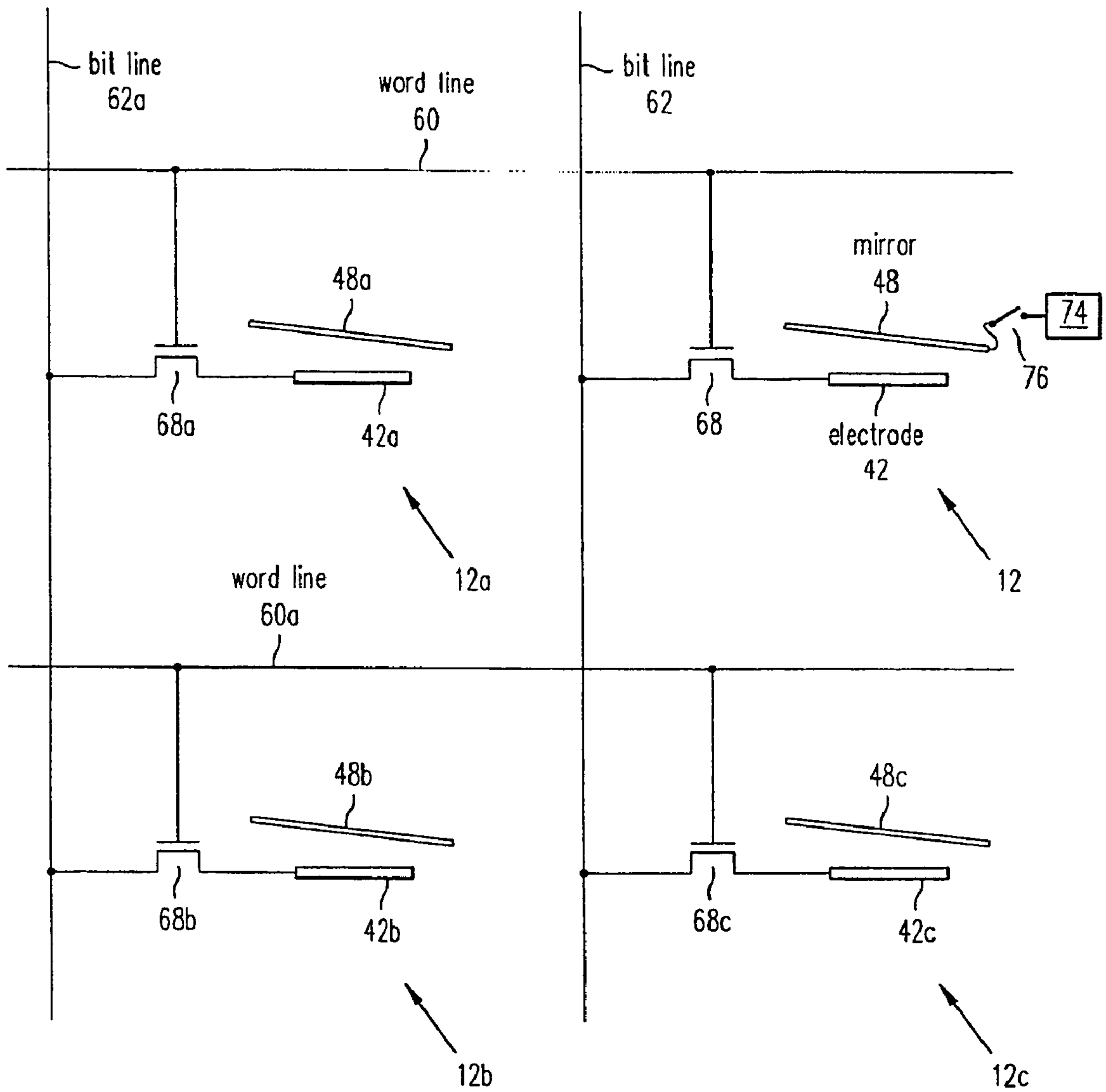
FIG. 6A shows a DRAM structure for individually addressing the SLM pixel cells of FIG. 1.
Figure 6B:
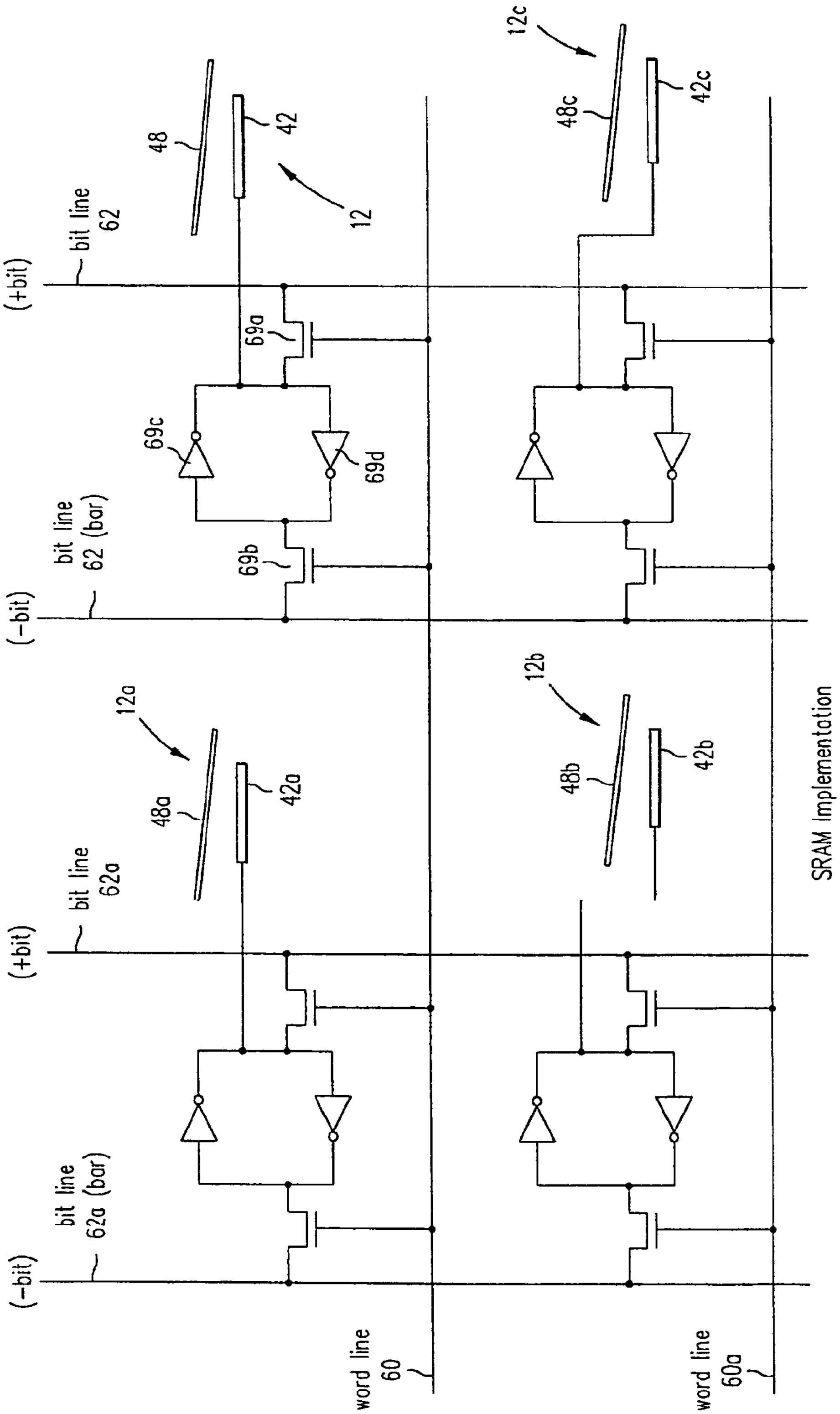
FIG. 6B shows an SRAM structure for individual addressing the SLM pixel cells of FIG. 1.

An electrical schematic of a memory array portion of addressing circuitry 36 is shown in FIG. 6A and FIG. 6B. If active addressing is employed, an addressing scheme embodied in the circuitry of FIG. 6A can be used to address each pixel cell of the SLM 10 individually. Substrates 20 and 34 are not shown in FIG. 6A, and the mirror 48 and bottom electrode 42 are drawn symbolically. The scheme is identical to that used for a DRAM (dynamic random access memory). Each pixel cell 12, 12*a*, 12*b* and 12*c* is driven by a respective NMOS transistor 68, 68*a*, 68*b* and 68*c*. For example, if pixel cell 12 is to be addressed, electrode 42 is charged as follows. The state of the corresponding column of pixels (containing pixel cells 12 and 12*c*) is set by holding the corresponding bit line 62 at the appropriate bias voltage for the desired mirror deflection. The bias is relative to the mirrors 48, which are connected to a common voltage such as ground. The corresponding word line 60 is then pulsed low-high-low (i.e., NMOS transistor 68 is temporarily opened) and the voltage value is stored as charge between the bottom electrode 42 and mirror 48. An additional capacitor may be placed electrically in parallel to the mirror-electrode combination to insure that enough charge is stored to overcome leakage.

Another embodiment uses an SRAM (static random access memory) type cell to drive the actuating electrodes (FIG. 6B). For example, pixel cell 12 is addressed by applying a voltage representing a binary one on the corresponding bit line 62. The voltage is sufficient to charge electrode 42 and deflect mirror 48. A voltage representing a binary zero is present on the other corresponding bit line 62(bar). The corresponding word line 60 is selected by asserting a voltage sufficient to open transistors 69*a* and 69*b*. The input to inverter 69*c* and the output from inverter 69*d* represent a binary zero. The output from inverter 69*c* and the input to inverter 69*d* represents a binary one. With transistor 69*a* open, electrode 42 is charged through bit line 62.

Since the mirror 48 area may be relatively large on semiconductor scales (12×12 microns=144 square microns), more complex circuitry can be manufactured beneath each actuating electrode. Possible circuitry includes, but is not limited to, storage buffers to store time sequential pixel information at each pixel; and electronic circuitry to compensate for possible non-uniformity of mirror/electrode separation by driving the electrodes at varying voltage levels.

With the appropriate choice of dimensions (substrate 20 and 34 separation of 1 to 5 μm and hinge thickness of 0.03 to 0.3 $\mu$m) and materials (silicon nitride), an SLM 10 can be made to have an operating voltage of only a few volts. The angular torsion modulus of hinge 50 may be, for example, approximately $3.3\times10^{-14}$ Newton meters per degree of rotation. As discussed above, the voltage at which the addressing circuitry must operate can be made even lower by maintaining the mirror 48 potential negative (or positive), as referenced to the circuit ground (the bias voltage). For example, in the negative bias case, this has the effect of shifting the hysteresis curve of FIG. 4 to the left, so that the actuating electrode array can operate in a low voltage range such as 0–5V and cause mirror deflection. This results in a larger difference in deflection angle for a given voltage. The maximum negative bias voltage is $-V_{release}$. The negative voltage may be asserted to mirror 48 by, for example, closing switch 76 coupling the mirror 48 to a voltage source 74 configured to assert a negative voltage (see pixel cell 12 of FIG. 6A).

Figure 7:
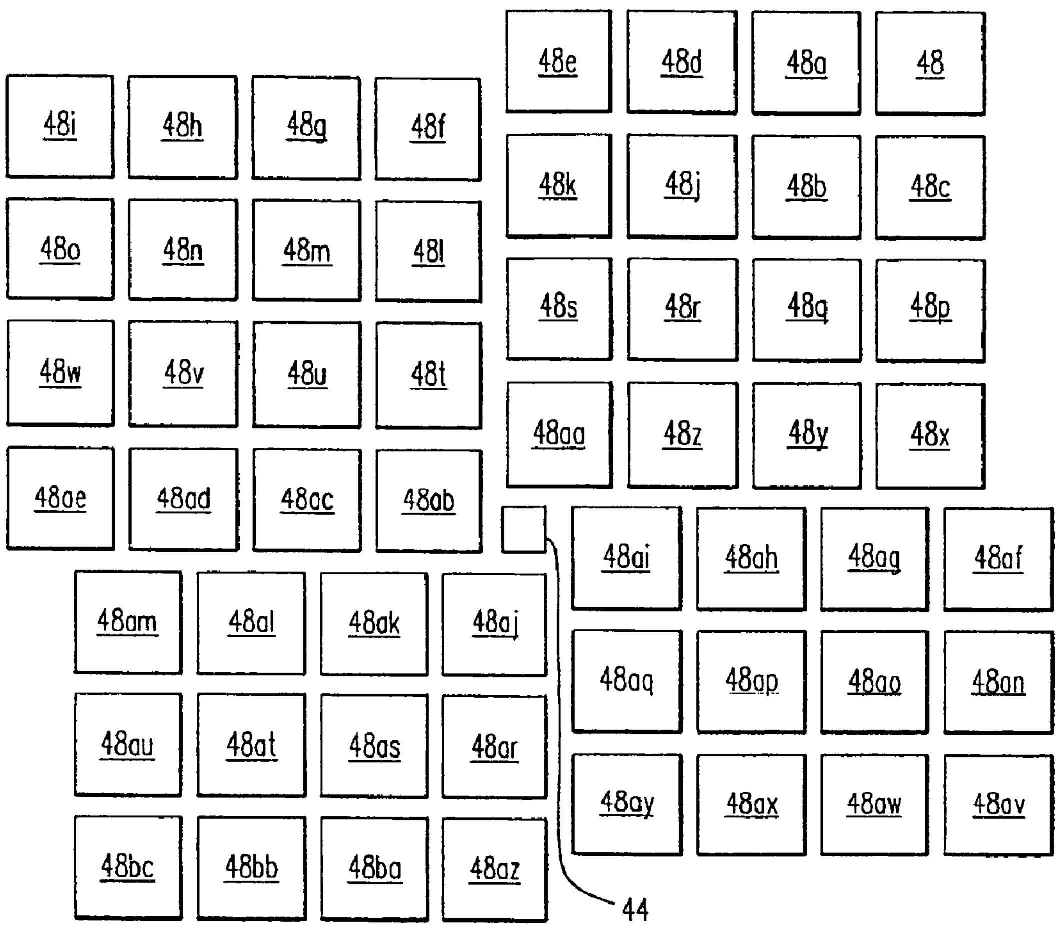
FIG. 7 shows a top view of a spacer placement in a dense pixel array.

Depending on the planarity and resistance to bending of the two substrates 20 and 34, spacers 44 may need to be embedded in the mirror array itself. FIG. 7 shows a top view of a reasonably contiguous mirror array having a spacer 44 in the middle. The mirror array includes 56 mirrors 48, 48*a* to 48*z*, 48*aa* to 48*az*, 48*ba*, 48*bb* and 48*bc*. For clarity, optically transmissive substrate 20 and circuit substrate 34 are not shown and each mirror 48 is represented as a square. Spacer 44 is centered among mirrors 48*aa*, 48*ab*, 48*ai* and 48*aj*, each mirror having an edge coplanar with a corresponding edge of spacer 44 as shown in FIG. 7.

FIG. 8A shows a top plan view of pixel cells 12 and 12*a* of the SLM 10 created by the process described with reference to FIGS. 2A–2D. The mirrors 48 and 48*a* rotate around the axis defined by the thin hinges 50 and 50*a*. Mirror 48 and 48*a* motion is limited by the motion stops 49 and 49*a*, which move towards and eventually hit the optically transmissive substrate 20 to which the mirrors 48 and 48*a* are attached (see FIG. 3B). In one embodiment, the diagonal lines represent the area which includes a relatively thick silicon nitride layer as compared to the thinner hinges. This reinforcement mechanically stiffens mirrors 48 and 48*a* while retaining flexibility in hinges 50 and 50*a*. Similar reinforcement is seen in FIGS. 8B–8E.

Figure 8B:
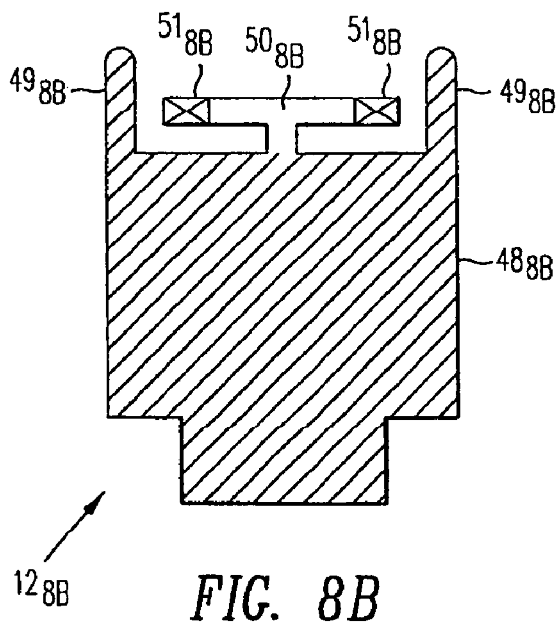
Figure 8C:
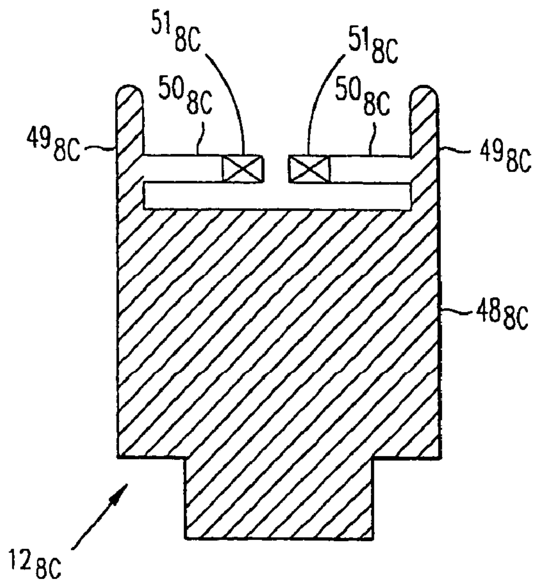
Figure 8D:
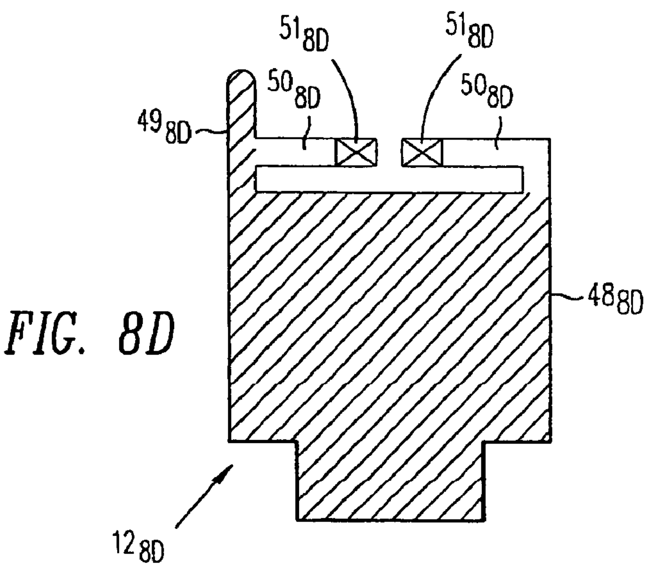
Figure 8E:
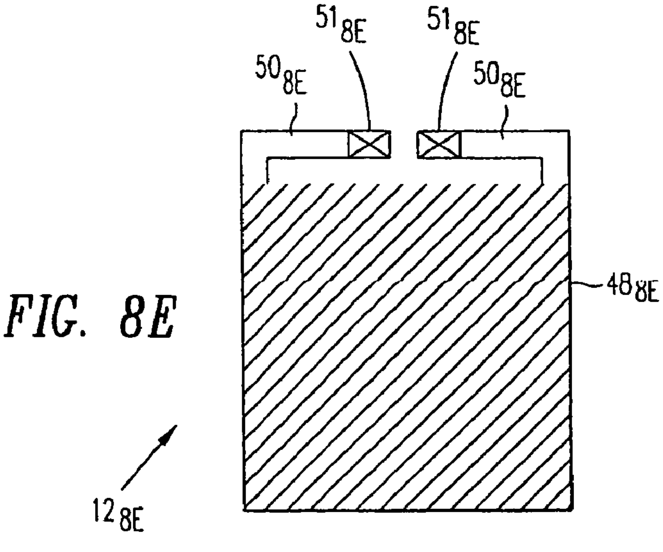

There exist many possible variations in the design of the mirror 48 that constitute the optically active component of the SLM 10. FIGS. 8A–8D show variations in which motion stop 49 and mirror 48 are substantially coplanar. One embodiment has two motion stops $\mathbf{49}_{8B}$ is shown in FIG. 8B. In FIG. 8C, hinges $\mathbf{50}_{8C}$ are connected directly to motion stops $\mathbf{49}_{8C}$. The embodiments of FIGS. 8C and 8D are similar except that FIG. 8D shows only one motion stop $\mathbf{49}_{8D}$. FIG. 8E shows supports $\mathbf{51}_{8E}$ that are adjacent. Pixel cell $\mathbf{12}_{8E}$ of FIG. 8E has no motion stops at all and is most useful if SLM 10 operates only at below $V_{snap}$.

Figure 8F:
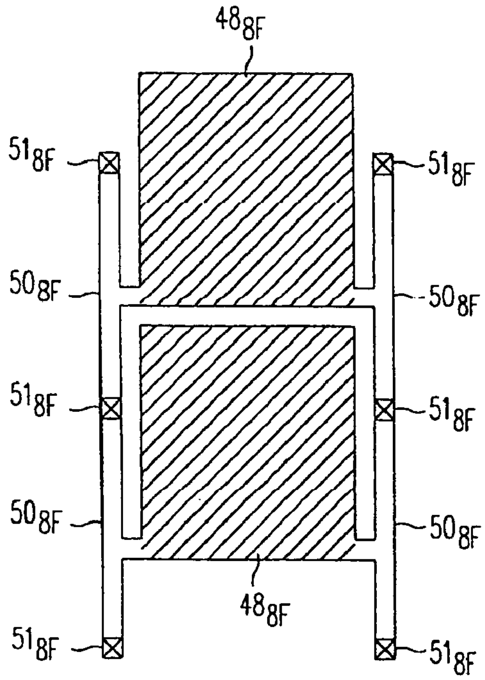
Figure 8G:
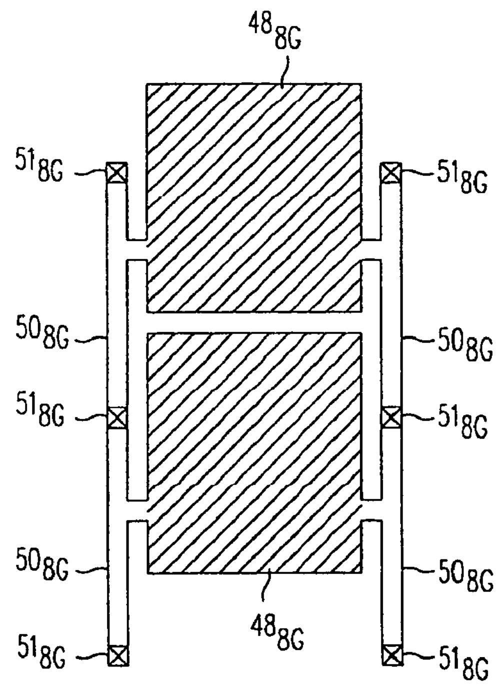
Figure 8H:
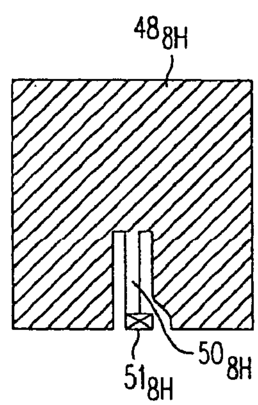

In the embodiments shown in FIGS. 8F and 8G, the hinges $\mathbf{50}_{8F}$ and $\mathbf{50}_{8G}$ operate by flexure and not by torsion. "Flexure" means that the ends of hinges $\mathbf{50}_{8F}$ and $\mathbf{50}_{8G}$ are fixed and that angular deflection of mirrors $\mathbf{48}_{8F}$ and $\mathbf{48}_{8G}$ causes hinge $\mathbf{50}_{8F}$ and $\mathbf{50}_{8G}$ to deflect angularly at a middle portion of hinges $\mathbf{50}_{8F}$ and $\mathbf{50}_{8G}$, thereby causing hinges $\mathbf{50}_{8F}$ and $\mathbf{50}_{8G}$ to stretch along the longitudinal direction of hinges $\mathbf{50}_{8F}$ and $\mathbf{50}_{8G}$. The hinges $\mathbf{50}_{8F}$ and $\mathbf{50}_{8G}$ of FIG. 8F and FIG. 8G have hinge supports $\mathbf{51}_{8F}$ and $\mathbf{51}_{8G}$ which tie hinges $\mathbf{50}_{8F}$ and $\mathbf{50}_{8G}$ down to optically transmissive substrate 20 (FIGS. 1, 2A, 2B, 2C, 2D, 2E, 2F, 3A, 3B, 9A, 9B, 9C, 9D, 10A, 10B, 10C, 11A, 11B, 11C, 12 and 13). Thus hinges $\mathbf{50}_{8F}$ and $\mathbf{50}_{8G}$ bend longitudinally and not torsionally. In this embodiment of hinges $\mathbf{50}_{8F}$ and $\mathbf{50}_{8G}$, the mechanical restoring force will increase with faster-than-linear dependence on deflection, as the strain in primarily tensile. A hinge $\mathbf{50}_{8F}$ or $\mathbf{50}_{8G}$ with this characteristic might be useful when the mirror 48 is operated in an analog manner, since the snapping angle (and thus $V_{snap}$) will be increased. In FIG. 8H, the hinge $\mathbf{50}_{8H}$ is a cantilever design, also operating by flexion and not by torsion.

A second fabrication process to produce the micro-mechanical SLM 10 of this invention is illustrated in cross-section in FIGS. 9A–9D and FIG. 10A. This process uses multiple silicon nitride layers to achieve a mirror-type structure with a higher aperture ratio (fraction of optically active area) than is possible with the process outlined in FIGS. 2A–2F. This is partly because the mirror stop $\mathbf{49}_{10A}$ (FIG. 10A) and mirror $\mathbf{48}_{10A}$ (FIG. 10A) lie in different planes. Optically transmissive substrate 20 is made of materials such as quartz which can withstand subsequent processing temperatures. In this process, the deposition of the light-blocking aperture layer 22 and protective layer 24, shown in FIGS. 1, 2A, 2B and 2C, has been skipped but could be added as the first step of the process.

Figure 9A:
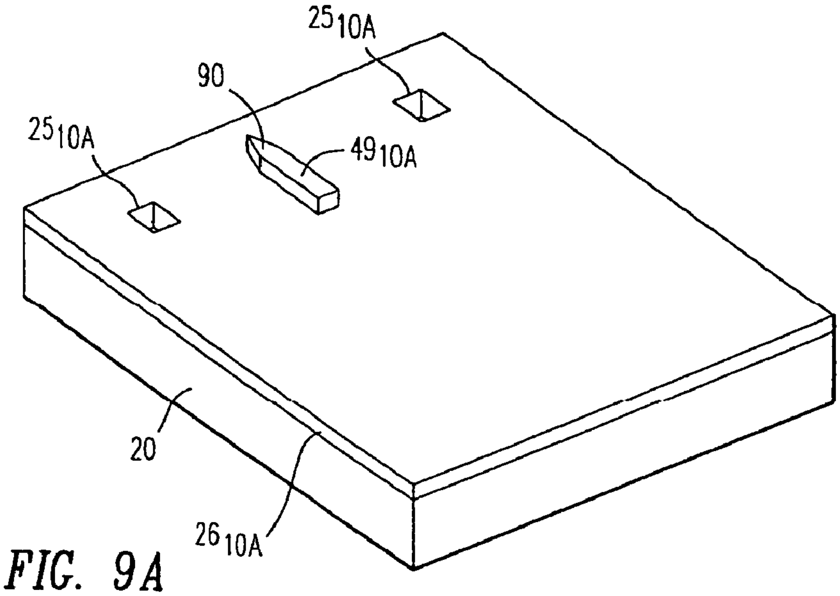
FIGS. 9A–9D show the fabrication process of a pixel cell having the hinge between the mirror and optically transmissive substrate (sub-hinge design)

Sacrificial layer $\mathbf{26}_{10A}$ (e.g., an approximately 0.5 micron thick, LPCVD-grown amorphous silicon layer) is deposited. After holes $\mathbf{25}_{10A}$ are patterned through to optically transmissive substrate 20 as seen in FIG. 9A, a motion stop layer (e.g., a 150 nm thick LPCVD-grown low-stress silicon nitride layer) is deposited and patterned to form the motion stop $\mathbf{49}_{10A}$ having a sharp contact tip 90.

Figure 9B:
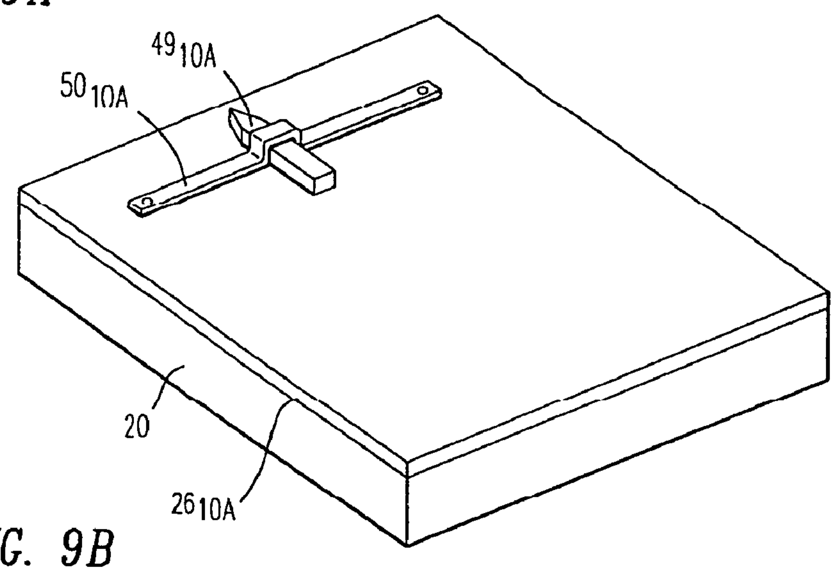
Figure 9C:
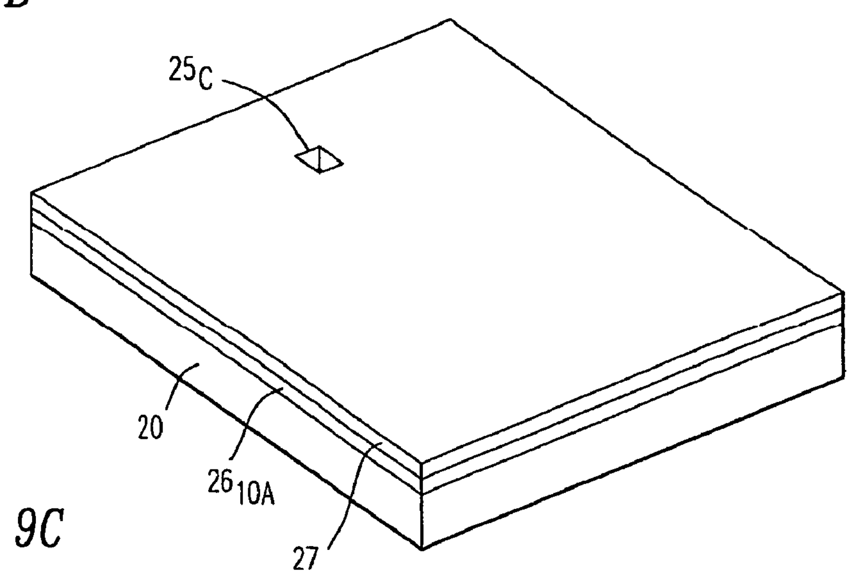
Figure 9D:
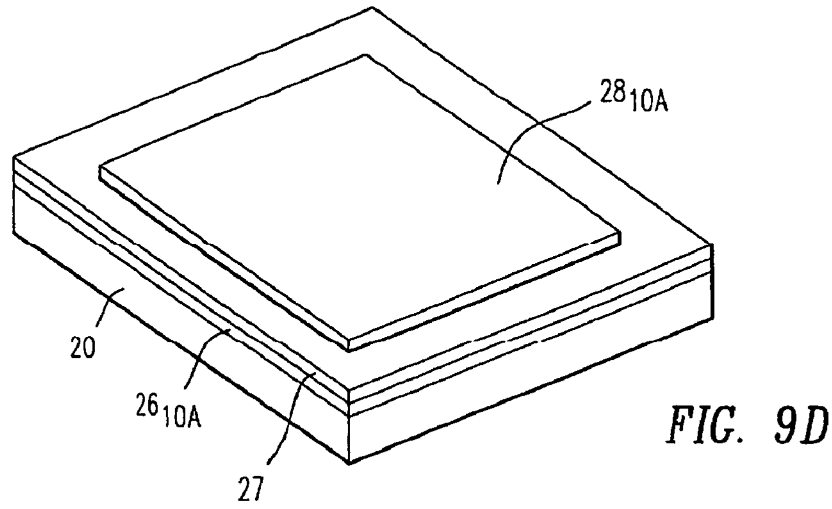

Next, a hinge layer (e.g., a 40 nm thick layer of low-stress silicon nitride) is grown and then patterned to define the torsion hinges $\mathbf{50}_{10A}$ as seen in FIG. 9B. A second sacrificial layer 27 is deposited (e.g., an approximately 0.5 micron thick, LPCVD-grown amorphous silicon layer), and patterned so that a hole 25*c* reaches down to the hinge $\mathbf{50}_{10A}$ (FIG. 9C). This second sacrificial layer $\mathbf{27}_{10A}$ could be polished with commonly known chemical mechanical polishing (CMP) techniques to achieve a flat surface for subsequent film depositions. Since subsequently deposited layers include the mirror structural support layer $\mathbf{28}_{10A}$, the mirror structural support layer $\mathbf{28}_{10A}$ will feature enhanced flatness thus improved reflective uniformity and improved system contrast and brightness. Finally, an approximately 138 nm thick silicon nitride mirror structural support layer $\mathbf{28}_{10A}$ is deposited and patterned to form the substantially rigid mirror plate (FIG. 9D).

Next, sacrificial layers $\mathbf{26}_{10A}$ and 27 are partially removed using an isotropic (e.g., a xenon diflouride gas etch; the 100% $SF_6$ plasma process refered to earlier may also be used) etch process, and the entire structure is coated with, for example, a very thin layer (30 nm) of aluminum (reflective layer $\mathbf{32}_{10A}$ of FIG. 10A) which is both highly reflective and serves to electrically connect the mirrors together as described above.

Finally the mirrors are fully released with a second isotropic etch process (for example, a xenon diflouride gas etch), completely removing the sacrificial layer $\mathbf{26}_{10A}$. The mirrors are now ready to be joined with the circuit substrate 34 containing addressing circuitry, using, for example, the same techniques described earlier in reference to FIG. 2 and FIG. 3. Thus a sub-hinge structure is fabricated in which a hinge $\mathbf{50}_{10A}$, which may be transparent, is disposed between the optically transmissive substrate 20 and the mirror 48.

Figure 10A:
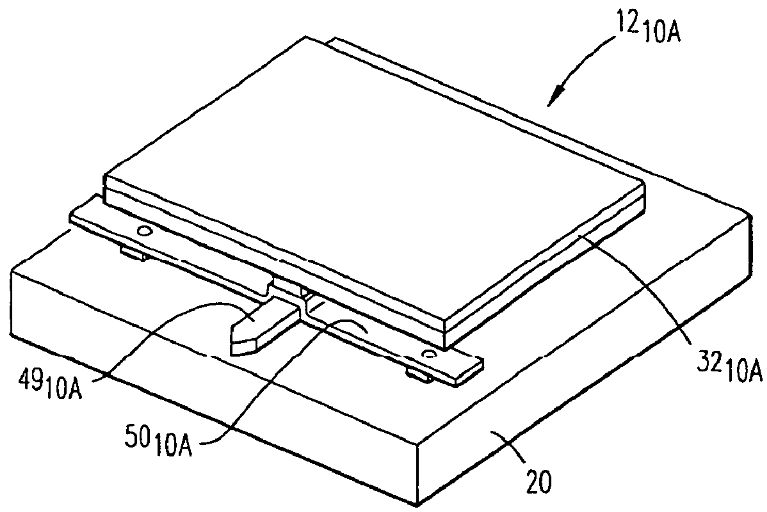
FIGS. 10A–10D show embodiments of the sub-hinge design.
Figure 10B:
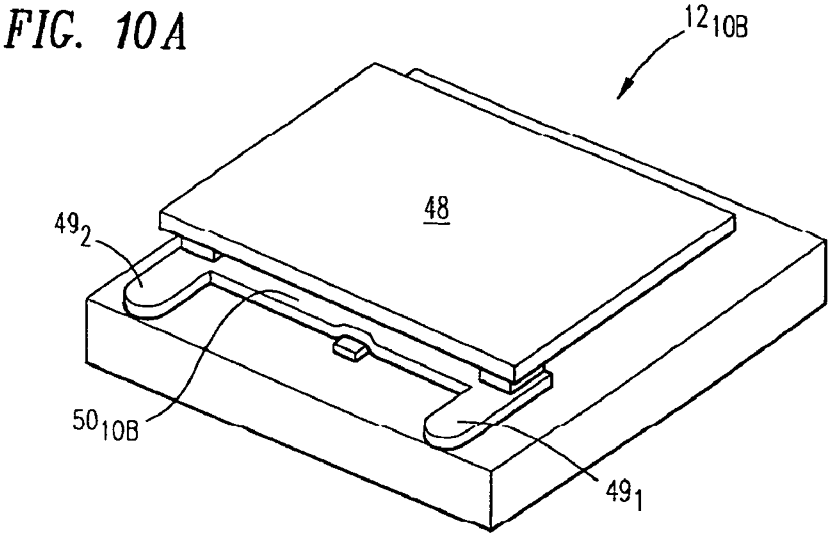
Figure 10C:
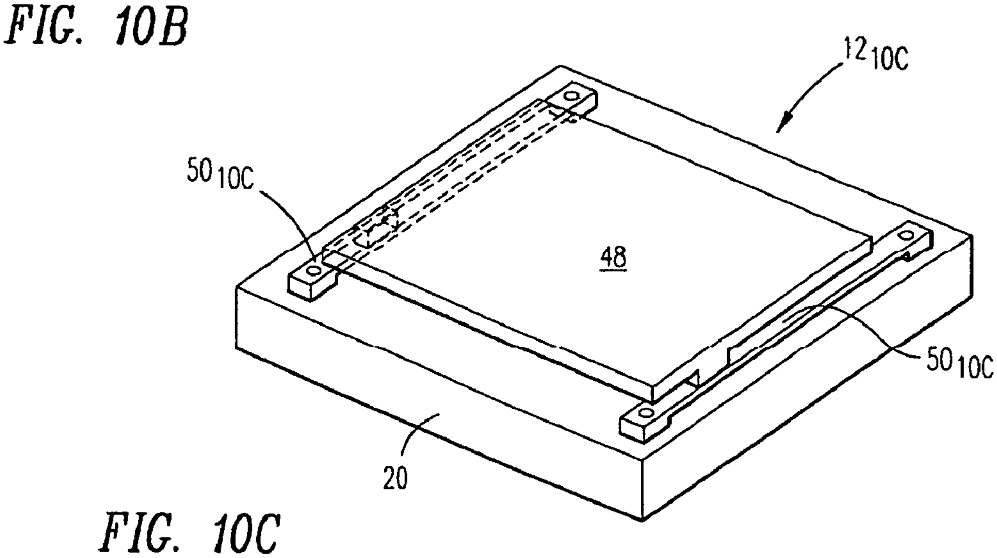
Figure 14:
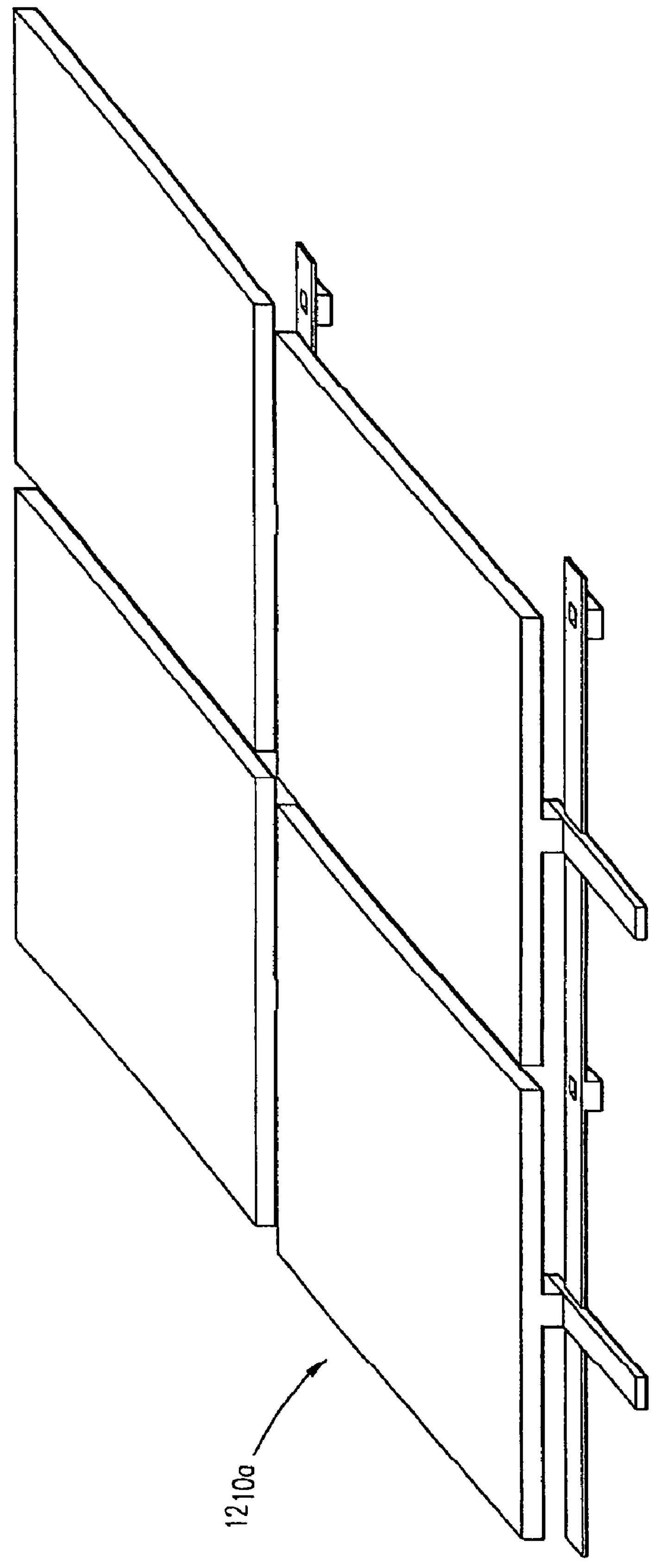
FIG. 14 shows a cell having the sub-hinge design of FIG. 10A configured in an array of similarly structured cells.

FIGS. 10A–10C show embodiments of the sub-hinge structure fabricated using the process above. For clarity, SLM's $\mathbf{10}_{10A\text{-}10D}$ are rotated 90 degrees so that hinges $\mathbf{50}_{10A\text{-}10D}$ may be seen. FIG. 10A shows a cell $\mathbf{12}_{10A}$ with a torsion hinge $\mathbf{50}_{10A}$ and one motion stop $\mathbf{49}_{10A}$ centrally located. This device is shown to scale in an array of similarly structure cells in FIG. 14. FIG. 10B shows an embodiment with two motion stops $\mathbf{49}_{10B}$. FIG. 10C shows a device that uses two ribbon-type hinges $\mathbf{49}_{10C}$, which also inherently provide the "motion stop" functionality in two ways. As mirror $\mathbf{48}_{10C}$ deflects, hinges $\mathbf{50}_{10C}$, which may be straight in the undeflected position, take on an S shape due to torque applied by mirror $\mathbf{48}_{10C}$. As the angular deflection of mirror $\mathbf{48}_{10C}$ increases, the hinges $\mathbf{50}_{10C}$ stretch, as well as bend. Thus, the mechanical restoring force for mirror $\mathbf{48}_{10C}$ increases at greater than a linear rate with reference to angular deflection. This non-linear quality is one way by which hinges $\mathbf{50}_{10C}$ function provide "motion stop" functionality even without contacting the optically transmissive substrate 20. A second way that "motion stop" functionality is achieved with this structure is by contact between the mirror $\mathbf{48}_{10C}$ and hinges $\mathbf{50}_{10C}$.

Figure 10D:
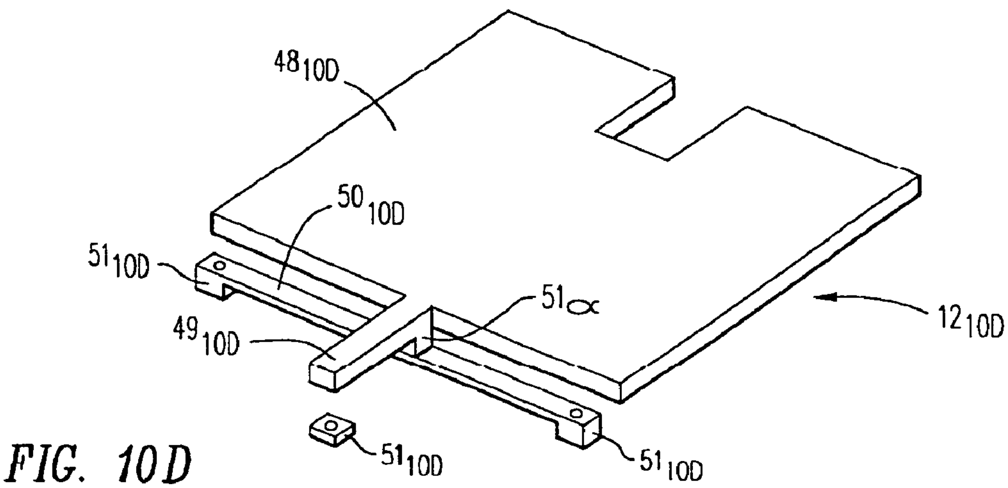

FIG. 10D shows yet another embodiment of a torsion hinge device, for which the step of depositing the motion stop layer can be eliminated, since it does not make use of separately fabricated motion stops. In the embodiment of FIG. 10D, contacts $\mathbf{51}_{10D}$ are formed through holes in a first sacrificial layer. A ribbon hinge $\mathbf{50}_{10D}$ is formed on the first sacrificial layer. A second sacrificial layer is formed over the hinge $\mathbf{50}_{10D}$ and the first sacrificial layer and formed with a hole which exposes a central portion of hinge $\mathbf{50}_{10D}$. Contact $\mathbf{51}_{\alpha}$ is formed through the hole and a single layer forming mirror $\mathbf{48}_{10D}$ and motion stop $\mathbf{49}_{10D}$ is deposited on top of the second sacrificial layer. The two sacrificial layers are then removed to free mirror $\mathbf{48}_{10D}$ and motion stop $\mathbf{49}_{10D}$.

A third fabrication process to produce the micro-mechanical spatial light modulator (SLM) of this invention is illustrated in cross-section in FIGS. 11A–11C and FIG. 12. This process also uses multiple silicon nitride layers to achieve a mirror-type structure with a higher aperture ratio (fraction of optically active area) than is possible with the process outlined in FIG. 2. Optically transmissive substrate 20 is made of a material such as quartz which can withstand subsequent processing temperatures. In this process, the deposition of the light-blocking aperture layer 22, protective layer 24 has been omitted from the process, but could be added as the first step in the process.

Figure 11A:
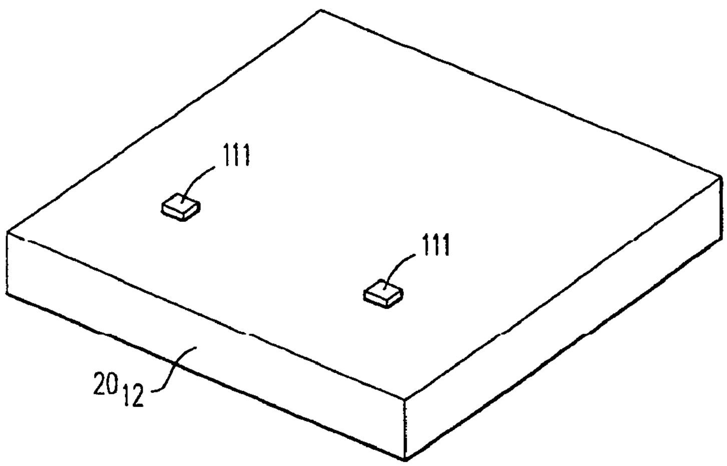
FIGS. 11A–11C show the fabrication process of a pixel cell having the mirror between the hinge and optically transmissive substrate (super-hinge design)
Figure 11B:
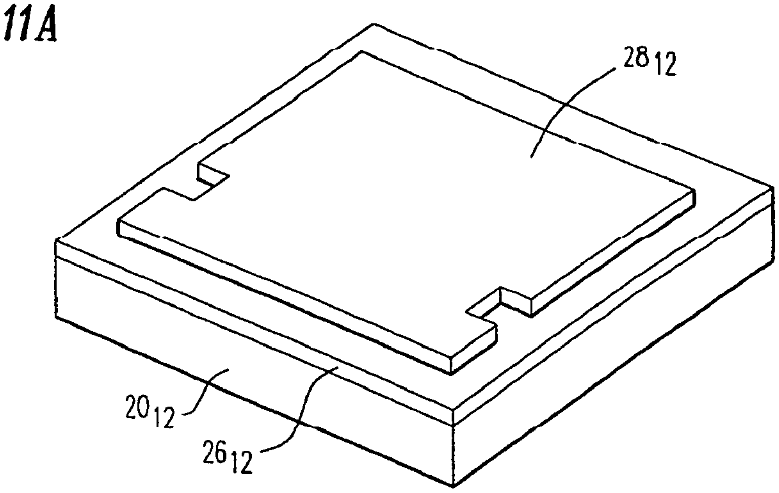
Figure 11C:
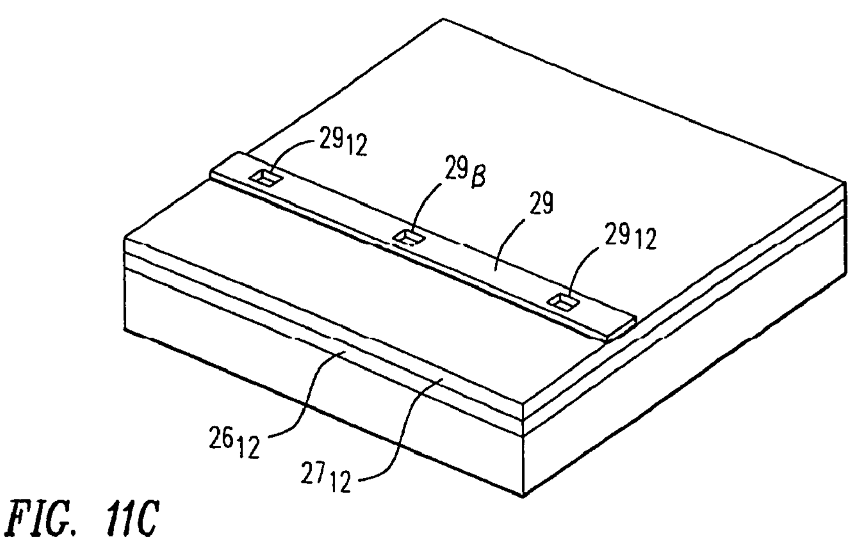

First, the optically transmissive substrate 20 is patterned and etched so that small bumps 111 are formed as contact points, as seen in FIG. 11A. Next, a 0.5 $\mu$m thick LPCVD-grown amorphous silicon sacrificial layer $\mathbf{26}_{12}$ is deposited, which will eventually be removed. This is followed by the deposition of a 138 nm thick silicon nitride mirror structural support layer $\mathbf{28}_{12}$, which is patterned to form the substantially rigid mirror plate $\mathbf{28}_{12}$ (FIG. 11B). Next, a second sacrificial layer $\mathbf{27}_{12}$ is deposited, and patterned so that hole $\mathbf{29}_{\beta}$ reaches down to the mirror plate 28, and so that holes $\mathbf{29}_{12}$ reach down to bumps 111. An approximately 40 nm thick low-stress silicon nitride hinge layer $\mathbf{29}_{12}$ is then grown and patterned to define the torsion hinges as seen in FIG. 11C.

Next, the sacrificial layers $\mathbf{26}_{12}$ and $\mathbf{27}_{12}$ are partially removed using a xenon diflouride isotropic etch process having an etch selectivity of over 100 to 1 (a 100% $SF_6$ plasma process may also be used), and the entire structure is coated with a very thin layer (30 nm) of aluminum which is both highly reflective and serves to electrically connect the mirrors together. Finally the mirrors are fully released with a second xenon diflouride etch process, completely removing the sacrificial layer $\mathbf{26}_{12}$. The mirrors are now ready to be joined with a semiconductor substrate containing addressing circuitry, using the same substrate bonding techniques described earlier in reference to FIG. 2 and FIG. 3.

Figure 12:
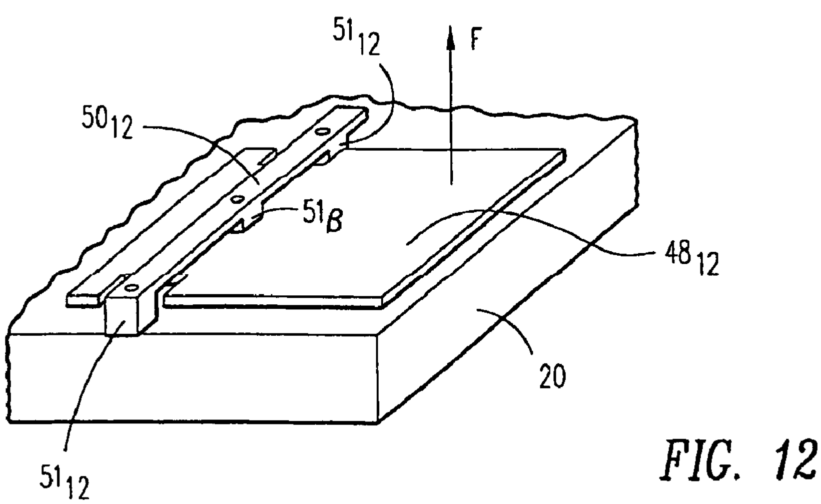
FIG. 12 shows an embodiment of the super-hinge design.

FIG. 12 shows an embodiment of the structure fabricated using the process above. Supports $\mathbf{51}_{12}$ are formed by the silicon nitride hinge layer deposition through holes $\mathbf{29}_{12}$. Hinge $\mathbf{50}_{12}$ is formed of hinge layer $\mathbf{29}_{12}$. Mirror $\mathbf{48}_{12}$ is the mirror plate $\mathbf{28}_{12}$ shown in FIG. 11B. This mirror is attached to hinge $\mathbf{50}_{12}$ via support $\mathbf{51}_{\beta}$. The mirror $\mathbf{48}_{12}$ is separated from optically transmissive substrate 20 in the undeflected position due to supports $\mathbf{51}_{12}$.

A single square mirror is not the only possible reflective deflectable element 48 possible; other designs, such as a cloverleaf or grating-like design are possible. For example, a row of skinny mirrors all deflecting in unison can form a switchable diffraction grating. It is also feasible that the reflective deflectable element is a metal-coated membrane. The deflectable element design could also be made so that one part of the element moves away from the lower substrate instead of towards it. Mirror elements can also be designed to deflect in more than one direction, i.e. have more than one controllable degree of freedom.

If the modulator is operated so that the reflective deflectable element touches the circuit substrate when actuated, such as would occur for the device embodiment shown in FIG. 8E, additional structure may be added to the circuit substrate. For example, in a mirror device, protruding bumps can be fabricated to reduce the total surface area actually in contact. The bumps are preferably at the same electrical potential as the mirror to avoid welding on contact. Additionally, a conducting transparent layer, such as indium tin oxide, can be deposited before the protective layer 24. A bias applied between the conducting transparent layer and the mirrors will actively pull the mirrors to the top substrate 20 and reset them to their off state.

There are many different methods to make electrical circuitry that performs the addressing function. The DRAM, SRAM, and passive addressing schemes described above, as well as latch devices commonly known to the art, may all perform the addressing function. The circuit substrate may be transparent, for example, quartz. In this case, transistors may be made from polysilicon, as compared to crystalline silicon.

In one embodiment, the aperture layer 22 may be further modified to comprise any binary optical pattern. In addition, other planar optical components can be integrated into the optically transmissive substrate 20, at either the top surface 16 or bottom surface 14 of optically transmissive substrate 20. Some of the many possible structures include color filters composed of one or a stack of layers, micro-lenses, and color-dispersive or diffractive features. See for example Jahns and Huang, "Planar Integration of Free-Space Optical components" Applied Optics, vol. 28, No. 9, 1 May 1989. The ability to integrate this optical functionality into the optically transmissive substrate can increase achievable contrast ratio and lowers cost by reducing the cost of free-space optics at the system level. In many embodiments of this invention, the mirror plates themselves can incorporate optical functionality beyond simple reflectivity. For example, the mirrors can be comprised of multiple substantially transparent layers to add filtering capability or to enhance reflectivity of certain wavelengths as compared to others. This is useful, for example, as a means to balance color deficiencies of the optical system, such as the spectrum of an illuminating lamp.

There are many fabrication process modifications which can be made. Instead of using an epoxy to bond the two substrates together, other materials, such as metals that melt at attainable process temperatures, or thermoplastics can be used. In any scheme, the spacers which hold the substrates apart can be built on either substrate. It is important to note that the method of deflection is also not necessarily restricted to electrostatic: thermal and piezo-electric actuation are among alternate possibilities. There can also be a top to bottom substrate electrical connection at each pixel, where elements that make up each pixel can be held at their own electrical potential. Chemical-mechanical polishing (CMP) can be added at several stages during the fabrication process, for example after the protective layer has been deposited on top of the patterned aperture layer, or after the mirror layer has been deposited, in order to make the optically active area of the mirror as flat as possible.

Many material substitutions are possible for the micromechanical elements: one possibility is the use of another type of ceramic (e.g. silicon dioxide) for the mirror, or even making the mirror completely out of a metal (e.g. an aluminum alloy). There are also many possibilities for the sacrificial layer material, such as silicon dioxide. Silicon could also be used instead of tungsten as the grid material. This would make the process more compatible with silicon nitride deposition facilities that are used for CMOS chip production. The grid and associated protective layer may also be left out entirely. Yet another combination of materials would be silicon (e.g., LPCVD polycrystalline silicon) for the deflectable elements (e.g. mirrors), and silicon dioxide (e.g., LPCVD grown) for the sacrificial layer. The silicon dioxide may be etched away with hydrofluoric acid, and drying may be accomplished using well-known critical-point-drying techniques to facilitate stiction-free mirror release. The spacers can also be made from a wide variety of materials, including various polymers, oxides, or metals.

In summary, the SLM 10 of this invention is a device that exhibits many desirable properties, including high resolution, high optical efficiency, high contrast ratio or modulation depth, and high mechanical reliability. The SLM 10 has application in a wide variety of areas, including projection display systems. Low switching voltages and the innovative design of the SLM 10 enable standard CMOS circuitry to be used as the addressing mechanism. The deflectable elements themselves can also be manufactured using standard processes available in silicon CMOS fabrication facilities, on a separate substrate. Both substrates can be fabricated using relatively gross features and less than state-of-the-art facilities. These factors make the SLM 10 easy and inexpensive to manufacture.

Although the present invention has been described above in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

I claim:

1. A spatial light modulator, comprising:

an optically transmissive substrate;

a silicon substrate;

wherein the silicon substrate and the optically transmissive substrate are bonded together forming a gap between the substrates; and a plurality of deflectable micromirrors enclosed within the gap;

wherein electrodes are provided on the silicon substrate to pull the micromirrors towards the silicon substrate;

and wherein a conducting transparent layer is provided on the optically transmissive substrate to pull the micromirrors towards the optically transmissive substrate;

and wherein the micromirrors are deflected by the electrodes on the silicon substrate and by the conducting transparent layer.

2. The spatial light modulator of claim 1, wherein the micromirrors comprise deflectable aluminum plates with hinges.

3. The spatial light modulator of claim 1, wherein the optically transmissive substrate is glass.

4. The spatial light modulator of claim 1, wherein the substrates are bonded together with a spacer therebetween using an adhesive.

5. The spatial light modulator of claim 4, wherein the adhesive is epoxy.

6. The spatial light modulator of claim 1, wherein the micromirrors are bistable.

7. The spatial light modulator of claim 6, wherein each micromirror comprises a mirror plate is attached to a hinge such that the mirror plate is operable to rotate between ON and OFF positions.

8. The spatial light modulator of claim 7, wherein the hinge is a torsion hinge.

9. The spatial light modulator of claim 7, wherein the mirror plate comprises first and second portions such that during the rotation of the mirror plate, the second portion moves towards the glass substrate and the first portion moves away from the glass substrate; and wherein the hinge and the mirror plate are positioned in different planes.

10. The spatial light modulator of claim 1, further comprising circuitry and electrodes on the silicon substrate for deflecting the mirror plates.

11. The spatial light modulator of claim 10, wherein the circuitry comprises SRAM circuits to drive the electrodes.

12. The spatial light modulator of claim 11, wherein a spacer is positioned outside the area of the micromirrors.

13. The spatial light modulator of claim 1, wherein the conducting transparent electrode on the optically transmissive substrate is a layer of indium tin oxide.

14. The spatial light modulator of claim 1, further comprising an aperture layer whereby light may pass only through a portion of the optically transmissive substrate.

15. The spatial light modulator of claim 14, wherein the aperture layer is opaque.

16. The spatial light modulator of claim 8, wherein the hinge is structured such that when a force is applied to the mirror plate bending occurs in the hinge, and, as a result, an angle between the mirror plate and the light transmissive substrate changes.

17. The spatial light modulator of claim 1, further comprising an opaque layer on the optically transmissive substrate that passes some light and blocks other light from passing through the optically transmissive substrate.

18. The spatial light modulator of claim 1, comprising in cross section, from top to bottom:

the substrate transmissive to visible light;

a first gap below the light transmissive substrate;

the deflectable element below the first gap;

a second gap below the deflectable element; and the hinge below the second gap.

19. The spatial light modulator of claim 8, wherein the hinge extends across the deflectable element between the electrode and the deflectable element and connects to the deflectable element towards a center part of the deflectable element.

20. The spatial light modulator of claim 1, wherein the modulator is configured so that when a first electrical potential difference is applied between the deflectable element and a corresponding electrode, the deflectable element moves to a deflected position and remains in the deflected position until a second electrical potential difference is applied between the deflectable element and the electrode.

21. The spatial light modulator of claim 1, wherein the gap between the silicon substrate and the optically transmissive substrate is partially evacuated.

22. The spatial light modulator of claim 1, wherein the gap between the silicon substrate and the optically transmissive substrate is partially evacuated.

23. The spatial light modulator of claim 10, wherein the electrodes on the silicon substrate are disposed closer to the light transmissive substrate than the circuitry.

24. The spatial light modulator of claim 1, wherein the circuitry comprises DRAM circuits to drive the electrodes.

25. A spatial light modulator, comprising:

an optically transmissive substrate;

a silicon substrate;

wherein the silicon substrate and the optically transmissive substrate are bonded together with a spacer therebetween forming a gap between the substrates;

a plurality of deflectable elements encapsulated within the gap;

SRAM or DRAM circuitry and electrodes on the silicon substrate for pulling the micromirror in a first direction;

an aperture layer on the optically transmissive substrate that allows light to pass only through a subset of the optically transmissive substrate; and a conducting transparent layer on the optically transmissive substrate for pulling the micromirrors in a second direction.

26. The spatial light modulator of claim 25, wherein the deflectable elements are electrically connected in rows, the electrodes are electrically connected in columns that cross the rows at the deflectable element locations, whereby individual mirrors may be turned on and off by selectively applying appropriate row and column biases and creating electrostatic attraction.

27. The spatial light modulator of claim 25, wherein the electrodes on the silicon substrate are disposed closer to the light transmissive substrate than the circuitry.

28. The spatial light modulator of claim 27, wherein the deflectable elements have hinges that are structured such that when a force is applied to the deflectable element, a bending occurs in the hinge, and, as a result, an angle between the deflectable element and the optically transmissive substrate changes.

29. The spatial light modulator of claim 28, wherein the deflectable element is a micromirror with a reflective layer.

30. The spatial light modulator of claim 25, wherein the spacer is positioned outside the plurality of deflectable elements.

31. The spatial light modulator of claim 25, wherein the gap between the silicon substrate and the optically transmissive substrate is partially evacuated.

32. The spatial light modulator of claim 25, wherein the conducting transparent layer comprises indium tin oxide.

33. The spatial light modulator of claim 25, wherein the deflectable elements are mirror plates that rotate in digital fashion between ON and OFF positions.

34. The spatial light modulator of claim 33, wherein each deflectable element comprises a motion stop to stop rotation of the deflectable element.

35. The spatial light modulator of claim 25, wherein the silicon and light transmissive substrates are bonded together with the spacer therebetween using an adhesive.

36. The spatial light modulator of claim 35, wherein the adhesive is epoxy.

37. The spatial light modulator of claim 34, wherein each deflectable element comprises two motion stops.

38. The spatial light modulator of claim 37, wherein the substrate that is optically transmissive is glass or quartz.

39. The spatial light modulator of claim 25, wherein the deflectable elements are electrically coupled to the silicon substrate.

40. The spatial light modulator of claim 25, wherein the electrodes are disposed higher than the SRAM or DRAM circuitry.

41. The spatial light modulator of claim 40, wherein deflectable element comprises a first portion and a second portion such that during deflection of the deflectable element, the second portion moves towards the light transmissive substrate as the first portion moves away from the light transmissive substrate.

42. The spatial light modulator of claim 41, wherein the deflectable element comprises a torsion hinge and mirror plate where the torsion hinge is disposed in a separate layer than the mirror plate.

43. The spatial light modulator of claim 42, wherein the hinge extends across the deflectable element between the electrode and the deflectable element and connects to the deflectable element towards a center part of the deflectable element.

44. The spatial light modulator of claim 25, wherein a single electrode on the silicon substrate is provided for electrostatically attracting a corresponding mirror plate.

45. The spatial light modulator of claim 44, wherein each deflectable element is pulled between ON and OFF positions by means of the single corresponding electrode on the silicon substrate and the conducting transparent layer on the optically transmissive substrate.

46. A projection system comprising:

a light source;

a spatial light modulator; and imaging optics;

wherein the spatial light modulator comprises:

an optically transmissive substrate;

a silicon substrate;

wherein the silicon substrate and the optically transmissive substrate are bonded together with a spacer therebetween forming a gap between the substrates;

a plurality of deflectable elements encapsulated within the gap;

SRAM or DRAM circuitry and electrodes on the silicon substrate for pulling the micromirror in a first direction;

an aperture layer on the optically transmissive substrate that allows light to pass only through a subset of the optically transmissive substrate; and a conducting transparent layer on the optically transmissive substrate for pulling the micromirrors in a second direction.

* * * * *